(12) United States Patent
Urushibata et al.

(10) Patent No.: US 11,597,441 B2
(45) Date of Patent: Mar. 7, 2023

(54) AUTOMOBILE STRUCTURAL MEMBER

(71) Applicant: NIPPON STEEL CORPORATION, Tokyo (JP)

(72) Inventors: Ryo Urushibata, Tokyo (JP); Yasuhiro Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/271,643

(22) PCT Filed: Sep. 9, 2019

(86) PCT No.: PCT/JP2019/035374
§ 371 (c)(1),
(2) Date: Feb. 26, 2021

(87) PCT Pub. No.: WO2020/050422
PCT Pub. Date: Mar. 12, 2020

(65) Prior Publication Data
US 2021/0339693 A1 Nov. 4, 2021

(30) Foreign Application Priority Data
Sep. 7, 2018 (JP) .............................. JP2018-167709

(51) Int. Cl.
*B62D 21/15* (2006.01)
*B60R 19/04* (2006.01)
(Continued)

(52) U.S. Cl.
CPC .............. *B62D 21/15* (2013.01); *B60R 19/04* (2013.01); *B60R 19/18* (2013.01); *B62D 25/025* (2013.01); *B62D 25/04* (2013.01); *B62D 25/20* (2013.01)

(58) Field of Classification Search
CPC ...... B62D 21/15; B62D 21/157; B62D 21/02; B62D 21/08; B60R 19/18
(Continued)

(56) References Cited

U.S. PATENT DOCUMENTS 5,636,866 A * 6/1997 Suzuki ..................... B60R 21/04
296/187.05
9,738,324 B1 * 8/2017 Vigil ....................... B21C 23/142
(Continued)

FOREIGN PATENT DOCUMENTS

| CN | 203497004 U | 3/2014 |
| CN | 106184380 A | 12/2016 |

(Continued)

*Primary Examiner* — Dennis H Pedder
(74) *Attorney, Agent, or Firm* — Birch, Stewart, Kolasch & Birch, LLP

(57) ABSTRACT

An automobile structural member being a hollow automobile structural member having: a top wall part; a bottom wall part facing the top wall part; and a first heightwise wall part and a second heightwise wall part being a pair of heightwise wall parts that connect to the top wall part and the bottom wall part, the automobile structural member including: a first reinforcing part having one end portion joined to the top wall part and the other end portion joined to the bottom wall part; and a second reinforcing part having one end portion joined to either the first heightwise wall part or the second heightwise wall part, and the other end portion joined to the first reinforcing part, in which a plurality of second reinforcing parts are provided along a height direction of the heightwise wall part.

16 Claims, 24 Drawing Sheets

(51) Int. Cl.
  *B62D 25/02* (2006.01)
  *B62D 25/04* (2006.01)
  *B62D 25/20* (2006.01)
  *B60R 19/18* (2006.01)

(58) Field of Classification Search
  USPC ............... 296/187.01, 9, 1, 193.06, 29, 30; 293/102, 122, 123
  See application file for complete search history.

(56) References Cited

U.S. PATENT DOCUMENTS

| | | | |
|---|---|---|---|
| 10,745,052 B2 * | 8/2020 | Maier | B62D 21/152 |
| 10,766,540 B2 * | 9/2020 | Sono | B62D 25/025 |
| 11,034,315 B2 * | 6/2021 | Dong | B60R 19/34 |
| 2006/0138790 A1 | 6/2006 | Okabe et al. | |
| 2010/0244481 A1 | 9/2010 | Ohno et al. | |
| 2011/0101714 A1 * | 5/2011 | Bator | F16F 7/121 29/428 |
| 2013/0088044 A1 | 4/2013 | Charbonneau et al. | |
| 2015/0084355 A1 | 3/2015 | Terada et al. | |
| 2015/0145288 A1 * | 5/2015 | Kellner | B62D 25/025 296/209 |
| 2017/0225717 A1 | 8/2017 | Otsuka et al. | |

FOREIGN PATENT DOCUMENTS

| | | | | |
|---|---|---|---|---|
| CN | 108099829 A | * | 6/2018 | B60R 19/18 |
| JP | 63-141058 A | | 6/1988 | |
| JP | 6-142754 A | | 5/1994 | |
| JP | H06142754 A | * | 5/1994 | |
| JP | 9-104299 A | | 4/1997 | |
| JP | 11-208521 A | | 8/1999 | |
| JP | 11-255048 A | | 9/1999 | |
| JP | 2006-176045 A | | 7/2006 | |
| JP | 2008-240969 A | | 10/2008 | |
| JP | 2009-90705 A | | 4/2009 | |
| JP | 2010-228729 A | | 10/2010 | |
| JP | 2013-193633 A | | 9/2013 | |
| KR | 20130139628 A | * | 12/2013 | B60R 19/18 |
| WO | WO 2016/031964 A1 | | 3/2016 | |

* cited by examiner

LADDER FRAME

STRUCTURE 4

STRUCTURE 5

STRUCTURE 6

STRUCTURE 7

STRUCTURE 8

STRUCTURE 9

STRUCTURE 10

STRUCTURE 11

STRUCTURE 12

STRUCTURE 13

STRUCTURE 15

STRUCTURE 16

STRUCTURE 17

STRUCTURE 18

PATTERN A

PATTERN B

PATTERN C ically, the insert member has a part provided with cross members positioned on a vehicle-exterior side in the vehicle width direction, and a hollow part which is positioned on a vehicle-interior side in the vehicle width direction and which is not provided with the cross members. In the side sill structure of Patent Document 1, when a side collision occurs, the part provided with the cross members is made to crush to absorb energy, and on the other hand, the hollow part is prevented from being crushed to protect a component such as a battery. Note that a pair of heightwise wall parts in the vehicle width direction of the insert member are not joined to a pair of heightwise wall parts of the side sill.

Patent Document 2 discloses a joining structure having a plate-shaped reinforcing member which is arranged so as to be sandwiched between a hat-shaped side sill inner panel and a hat-shaped side sill outer panel. In the joining structure of Patent Document 2, in a state where the reinforcing member is sandwiched between flange parts of the side sill inner panel and flange parts of the side sill outer panel, the respective flange parts are spot-welded, and thus the respective members are joined to one another.

Patent Document 3 discloses a bumper beam structure provided with a gusset that forms a closed cross section on a front surface side of a bumper beam main body.

Patent Document 4 discloses a bumper reinforcement having ribs that connect a front wall and a rear wall, and other ribs that connect between the rib and an upper wall and between the rib and a lower wall. Patent Document 5 discloses a structural member having main stays that connect a pair of facing walls, and reinforcing stays that connect the main stays and short-side walls. Patent Document 6 discloses a front structure of a vehicle having horizontal ribs laid between a pair of right and left peripheral walls, and vertical ribs that intersect the horizontal ribs and connect between the horizontal rib and an upper peripheral wall and between the horizontal rib and a lower peripheral wall. Patent Document 7 discloses a vehicle bumper structure having transverse rib parts that connect a front wall part and a rear wall part, and longitudinal rib parts that connect between the transverse rib part and an upper wall part and between the transverse rib part and a lower wall part. Patent Document 8 discloses a vehicle bumper structure having ribs that connect a bumper cover and a bumper reinforcement, and heightwise wall parts that connect between the rib and an upper wall part of the bumper cover and between the rib and a lower wall part of the bumper cover. Patent Document 9 discloses a structural member in which a space in a hollow part having a rectangular cross section is divided in an X-shape.

AUTOMOBILE STRUCTURAL MEMBER

TECHNICAL FIELD

The present invention relates to an automobile structural member.

BACKGROUND ART

In recent years, a reduction in weight of an automobile vehicle body has been promoted, in response to severity of $CO_2$ emission control of automobile. On the other hand, with respect to a structural member such as a side sill or a bumper beam, it has been demanded to improve an energy absorption performance when a collision occurs. However, in accordance with the reduction in weight of the structural member, bending rigidity of the structural member is reduced, so that a measure has been taken such that a reinforcing member is arranged inside the structural member.

Patent Document 1 discloses a side sill structure in which an insert member is provided inside a side sill in a hollow state. The insert member in Patent Document 1 is configured by two parts with different shapes of members in a vehicle width direction. Specif-

PRIOR ART DOCUMENT

Patent Document

Patent Document 1: Specification of U.S. patent application publication No. 2013/0088044
Patent Document 2: International Publication Pamphlet No. WO 2016/031964
Patent Document 3: Japanese Laid-open Patent Publication No. 2006-176045
Patent Document 4: Japanese Laid-open Patent Publication No. H09-104299
Patent Document 5: Japanese Laid-open Patent Publication No. H11-255048
Patent Document 6: Japanese Laid-open Patent Publication No. 2010-228729
Patent Document 7: Japanese Laid-open Patent Publication No. 2009-090705
Patent Document 8: Japanese Laid-open Patent Publication No. S63-141058
Patent Document 9: Japanese Laid-open Patent Publication No. 2008-240969

SUMMARY OF THE INVENTION

Problems to be Solved by the Invention

In the side sill structure of Patent Document 1, the insert member itself inside the side sill is crushed, to thereby improve the energy absorption amount, but, the structure is not one that utilizes the material property of the entire side sill, and thus there is room for improvement in terms of weight efficiency regarding the energy absorption performance. Further, also in the structures of Patent Documents 2 to 9, there is room for improvement in terms of energy absorption efficiency (weight efficiency of energy absorption performance).

The present invention has been made in view of the above-described circumstances, and an object thereof is to improve an energy absorption efficiency and to realize both reduction in weight and improvement of energy absorption performance in an automobile structural member.

Means for Solving the Problems

One aspect of the present invention for solving the above-described problems is an automobile structural member being a hollow automobile structural member having: a top wall part; a bottom wall part facing the top wall part; and a first heightwise wall part and a second heightwise wall part being a pair of heightwise wall parts that connect to the top wall part and the bottom wall part, the automobile structural member including: a first reinforcing part having one end portion joined to the top wall part and the other end portion joined to the bottom wall part; and a second reinforcing part having one end portion joined to either the first heightwise wall part or the second heightwise wall part, and the other end portion joined to the first reinforcing part, in which a plurality of the second reinforcing parts are provided along a height direction of the heightwise wall part.

It is possible that the above-described automobile structural member in which the one end portion of the second reinforcing part is joined to the first heightwise wall part and the other end portion of the second reinforcing part is joined to the first reinforcing part, further includes: another first reinforcing part having one end portion joined to the top wall part and the other end portion joined to the bottom wall part, and provided between the first reinforcing part and the second heightwise wall part; and another second reinforcing part having one end portion joined to the second heightwise wall part and the other end portion joined to the other first reinforcing part, in which a plurality of the other second reinforcing parts are provided along the height direction of the heightwise wall part.

It is preferable that the first reinforcing parts, whose number is two, which are mutually joined via the top wall part and the bottom wall part, are not mutually joined at parts except for the top wall part and the bottom wall part.

It is preferable that, when a distance between the top wall part and the bottom wall part is referred to as a member height, a region from a central position of the member height to the top wall part side is referred to as a first region, and a region from the central position of the member height to the bottom wall part side is referred to as a second region, a number of the second reinforcing parts provided in the first region is larger than a number of the second reinforcing parts provided in the second region.

It is preferable that, when an interval between the second reinforcing parts in the height direction of the heightwise wall part is set to b, and a distance between the heightwise wall part to which the second reinforcing parts are joined and the first reinforcing part is set to a, $0<b/a\leq4.0$ is satisfied.

It is preferable that, when a distance between the first heightwise wall part and the second heightwise wall part is referred to as a member width, a distance from a central position of the member width to the heightwise wall part to which the one end portion of the second reinforcing part is joined is set to $Wh_0$, and a distance from the central position of the member width to the first reinforcing part to which the other end portion of the second reinforcing part is joined is set to Wh, $0\leq(Wh/Wh_0)\times100\leq95$ is satisfied.

It is possible that the top wall part, the bottom wall part, the first heightwise wall part, the second heightwise wall part, the first reinforcing part, and the second reinforcing part are integrally molded.

It is preferable that a length of the first reinforcing part and the second reinforcing part in a longitudinal direction of the automobile structural member is 2% or more of a length in the longitudinal direction of the automobile structural member.

It is preferable that an angle made by a plane parallel to the top wall part and the second reinforcing part is 60° or less.

The above-described automobile structural member may be a side sill, a center pillar, or a side member of a ladder frame. In this case, the top wall part is preferably a wall part on a vehicle-exterior side in a vehicle width direction. The above-described automobile structural member may be a bumper beam or a cross member of a ladder frame. In this case, the top wall part is preferably a wall part on a vehicle-exterior side in a vehicle length direction.

Effect of the Invention

In an automobile structural member, it is possible to improve an energy absorption efficiency, and to realize both reduction in weight and improvement of energy absorption performance.

EMBODIMENTS FOR CARRYING OUT INVENTION

Figure 1:
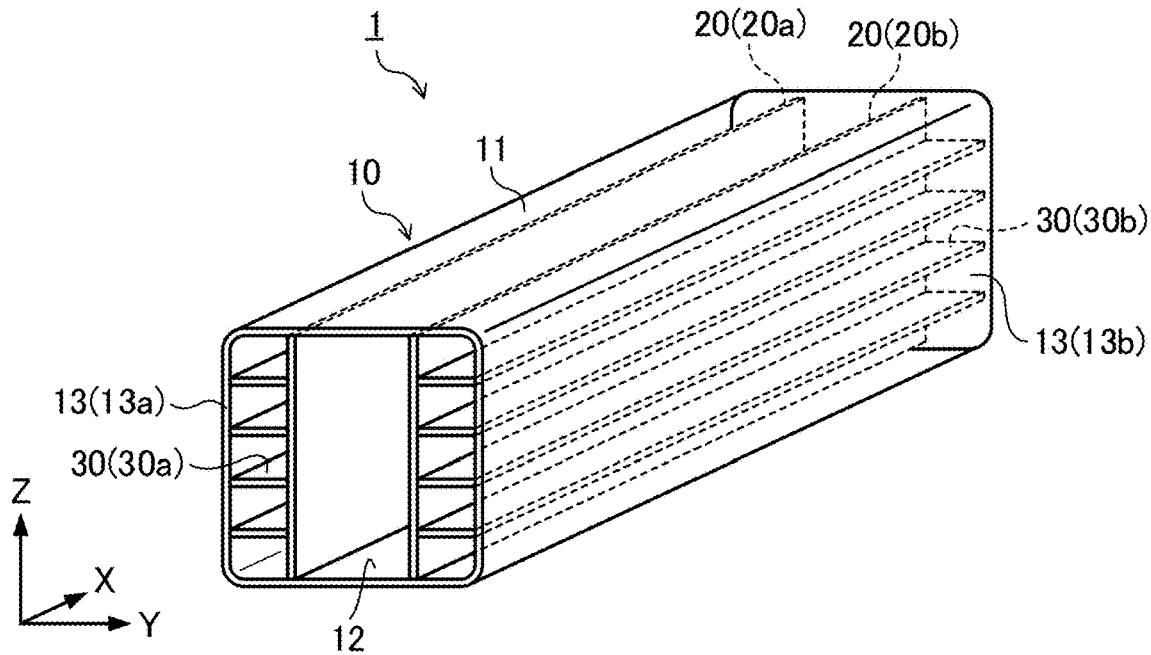
FIG. 1 is a perspective view illustrating a schematic configuration of an automobile structural member according to a first embodiment of the present invention.

Hereinafter, one embodiment of the present invention will be described while referring to the drawings. Note that in the present description and the drawings, elements having substantially the same functional configurations are denoted by the same codes to omit overlapped explanation.

First Embodiment

Figure 2:
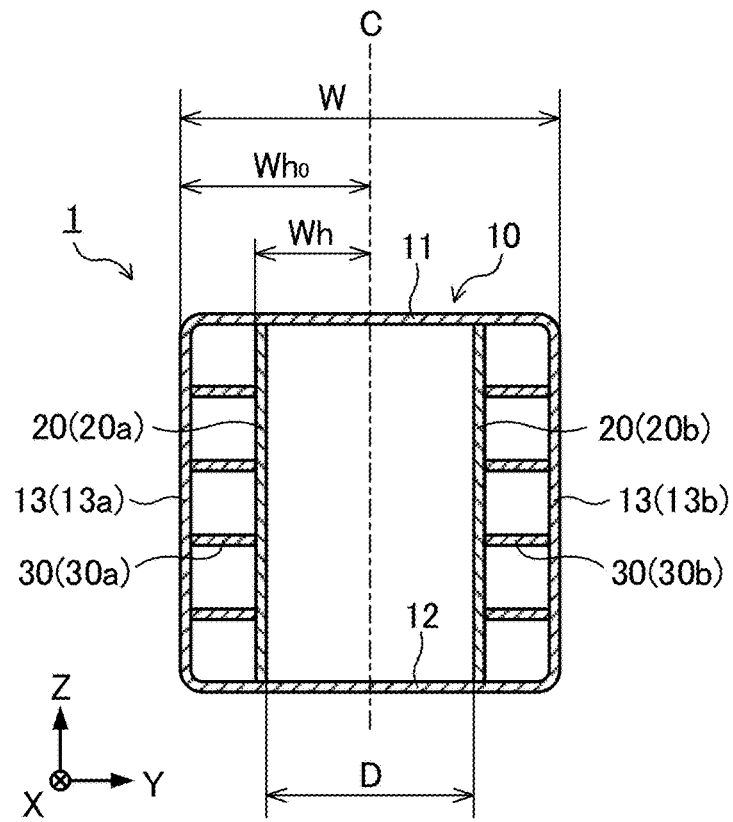
FIG. 2 is a view illustrating a cross section of the automobile structural member perpendicular to an X direction (a longitudinal direction of the member).

As illustrated in FIG. 1 and FIG. 2, an automobile structural member 1 of the present embodiment has a hollow section 10 in a shape of angular tube, and the hollow section 10 is configured by four wall parts. Specifically, the hollow section 10 has four wall parts composed of a top wall part 11, a bottom wall part 12 being a wall part facing the top wall part 11, and heightwise wall parts 13 being a pair of wall parts that connect to the top wall part 11 and the bottom wall part 12. In the present description, for the sake of convenience of explanation, a left-side heightwise wall part 13 in the drawings is referred to as a first heightwise wall part 13a, and a right-side heightwise wall part 13 is referred to as a second heightwise wall part 13b. A material of each of the top wall part 11, the bottom wall part 12, the first heightwise wall part 13a, and the second heightwise wall part 13b is not particularly limited, and, for example, a steel material, an aluminum alloy member, a magnesium alloy member, various resin materials such as a fiber reinforced resin, and so on, can be employed.

The hollow section 10 of the present embodiment has a square-shaped closed cross-section space in a cross section perpendicular to an X direction being a longitudinal direction of the automobile structural member 1, in which the top wall part 11 and the bottom wall part 12 are parallel to each other, and the first heightwise wall part 13a and the second heightwise wall part 13b are parallel to each other. Further, the first heightwise wall part 13a and the second heightwise wall part 13b are respectively perpendicular to the top wall part 11 and the bottom wall part 12. In the present description, the X direction, a Y direction, and a Z direction are perpendicular to one another.

Figure 3:
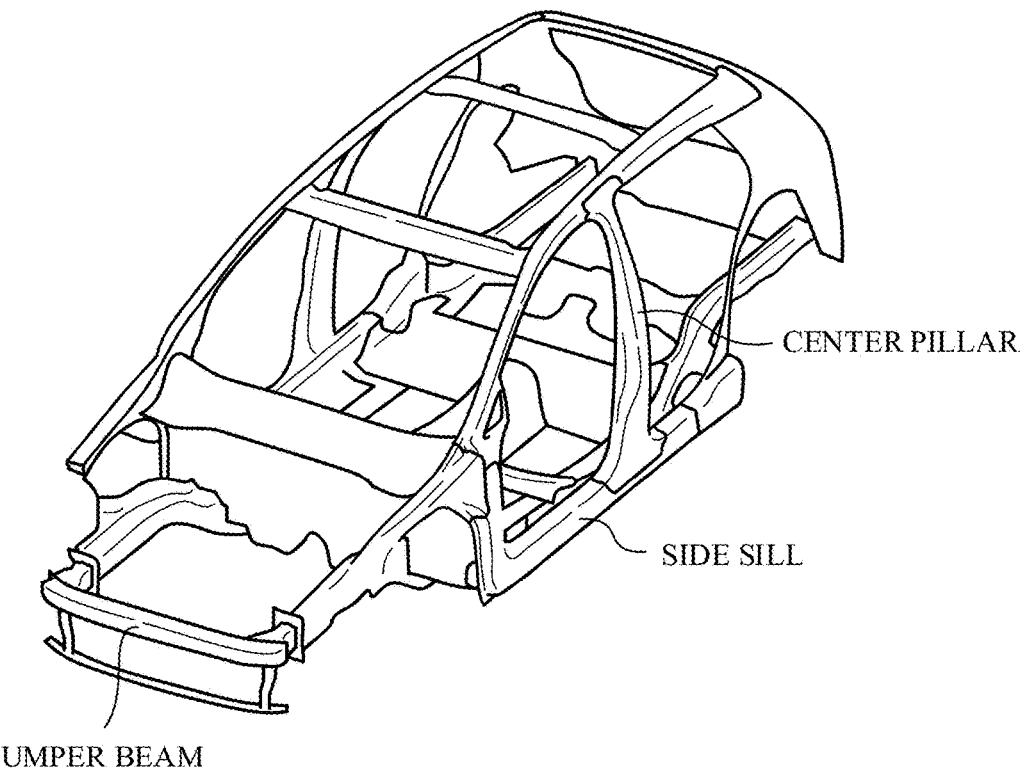
FIG. 3 is a view illustrating one example of a vehicle body framework of an automobile.
Figure 4:
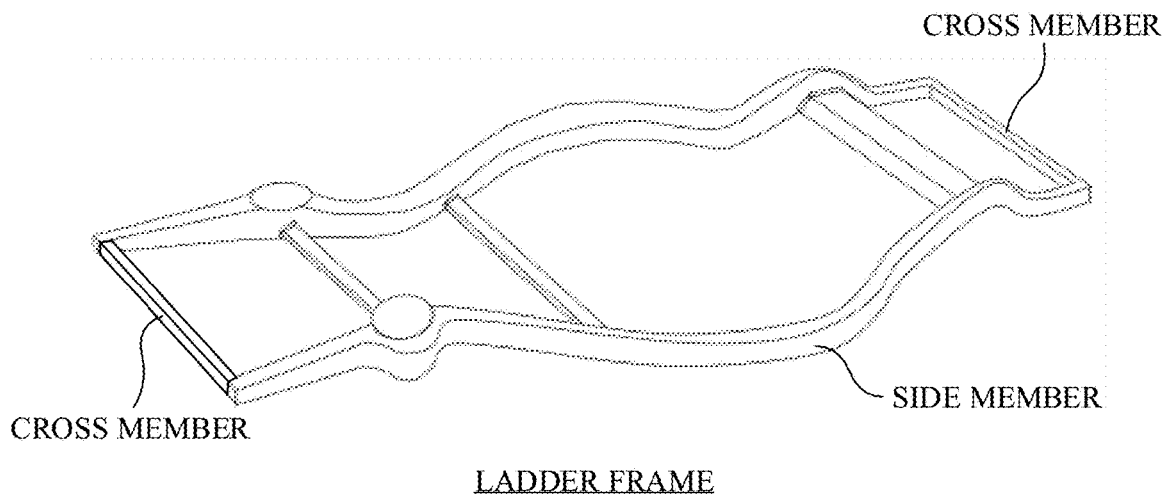
FIG. 4 is a view illustrating one example of a ladder frame.

FIG. 3 is a view illustrating one example of a vehicle body framework of an automobile. When the automobile structural member 1 is a side sill, for example, the X direction is a vehicle length direction, the Y direction is a vehicle height direction, and the Z direction is a vehicle width direction. When the automobile structural member 1 is a bumper beam, for example, the X direction is the vehicle width direction, the Y direction is the vehicle height direction, and the Z direction is the vehicle length direction. When the automobile structural member 1 is a center pillar, for example, the X direction is the vehicle height direction, the Y direction is the vehicle length direction, and the Z direction is the vehicle width direction. When the automobile structural member 1 is a side member of a ladder frame as illustrated in FIG. 4, for example, the X direction is the vehicle length direction, the Y direction is the vehicle height direction, and the Z direction is the vehicle width direction. When the automobile structural member 1 is a cross member of the ladder frame, for example, the X direction is the vehicle width direction, the Y direction is the vehicle height direction, and the Z direction is the vehicle length direction. Note that the shape of the closed cross-section space of the hollow section 10 in the cross section perpendicular to the X direction may also be a rectangular shape, for example. Further, in the hollow section 10, the wall parts in a parallel relation may not be parallel to each other in a strict manner, and the wall parts in a perpendicular relation may not be perpendicular to each other in a strict manner. Further, the hollow section 10 may also be partially provided with a bead or a hole.

Figure 5:
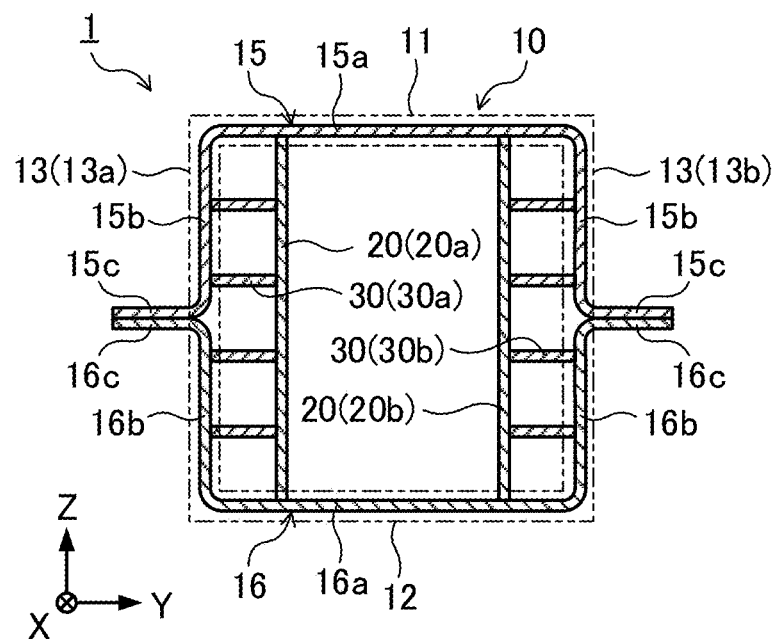
FIG. 5 is a view illustrating one example of a cross-sectional shape of an automobile structural member.

The top wall part 11, the bottom wall part 12, the first heightwise wall part 13a, and the second heightwise wall part 13b may be manufactured through integral molding such as extrusion molding, for example. Further, for example, the hollow section 10 may also be configured in a manner that an outer panel 15 formed in a hat shape and an inner panel 16 formed in a hat shape are joined to each other, as illustrated in FIG. 5. In the example of FIG. 5, the outer panel 15 has a top wall part 15a, heightwise wall parts 15b, and flange parts 15c, and the inner panel 16 has a top wall part 16a, heightwise wall parts 16b, and flange parts 16c. In the example of FIG. 5, the flange parts 15c of the outer panel 15 and the flange parts 16c of the inner panel 16 are joined to each other, to thereby configure the hollow section 10. Also in the case of FIG. 5, the hollow section 10 has the above-described top wall part 11, bottom wall part 12, and pair of heightwise wall parts 13. Specifically, in the example of FIG. 5, the top wall part 15a of the outer panel 15 corresponds to the top wall part 11 of the hollow section 10, and the top wall part 16a of the inner panel 16 corresponds to the bottom wall part 12 of the hollow section 10. Further, the pair of heightwise wall parts 13a, 13b of the hollow section 10 are configured by the heightwise wall parts 15b of the outer panel 15 and the heightwise wall parts 16b of the inner panel 16. A shape of a closed cross-section space in a cross section perpendicular to the X direction in the case of FIG. 5, also has a square shape or a rectangular shape, for example, according to the shape of the outer panel 15 and the inner panel 16, similarly to the case of the aforementioned hollow section 10 in the shape of angular tube.

Figure 6:
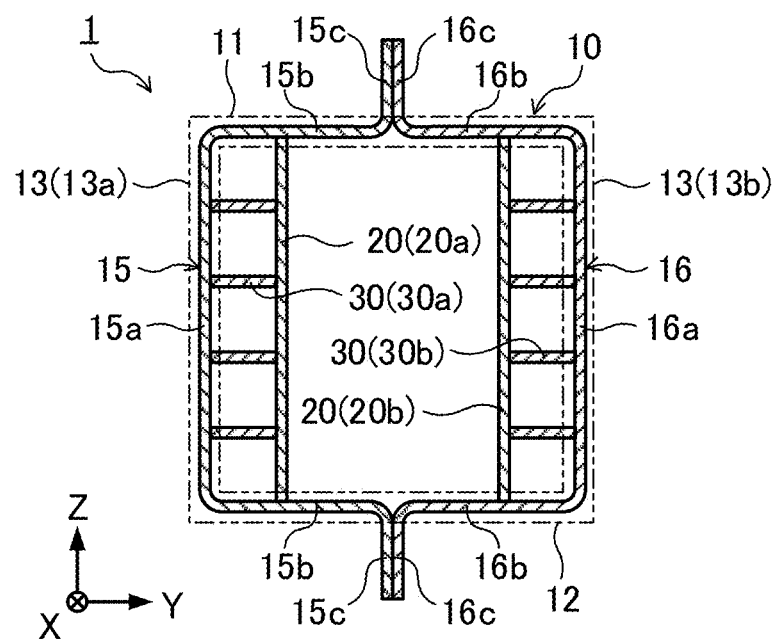
FIG. 6 is a view illustrating one example of a cross-sectional shape of an automobile structural member.
Figure 7:
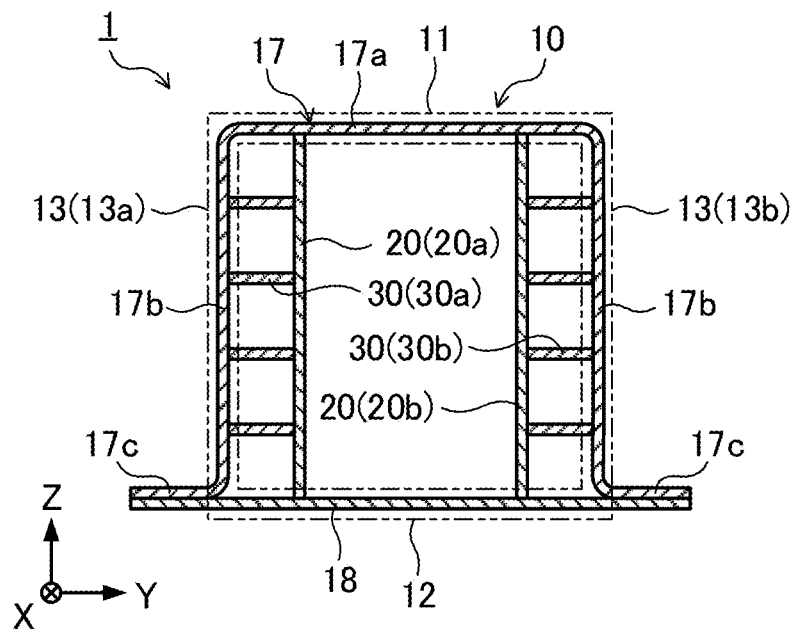
FIG. 7 is a view illustrating one example of a cross-sectional shape of an automobile structural member.
Figure 8:
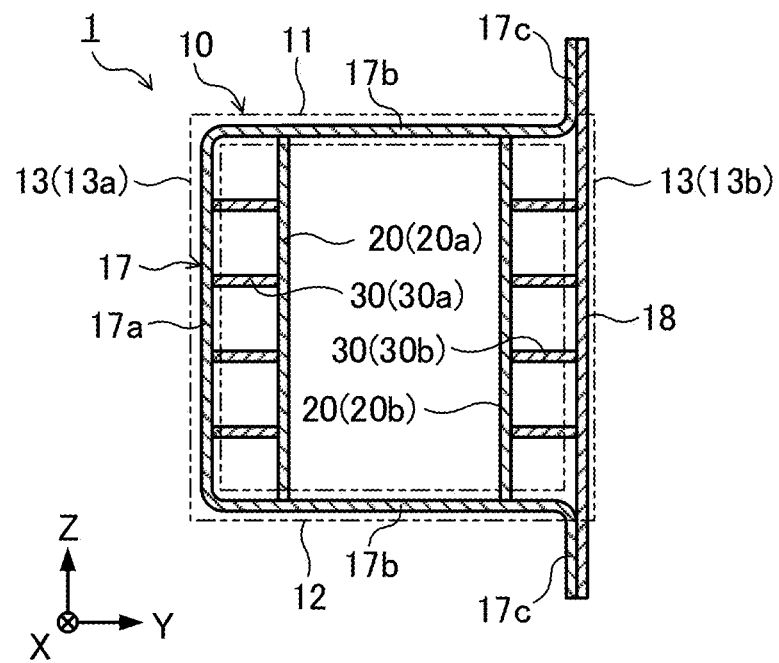
FIG. 8 is a view illustrating one example of a cross-sectional shape of an automobile structural member.

Regarding the hollow section 10, it is also possible that the top wall part 11 and the bottom wall part 12 of the hollow section 10 are configured by the heightwise wall parts 15b of the outer panel 15 and the heightwise wall parts 16b of the inner panel 16, as illustrated in FIG. 6. In the example of FIG. 6, the top wall part 15a of the outer panel 15 and the top wall part 16a of the inner panel 16 correspond to the pair of heightwise wall parts 13a, 13b of the hollow section 10. The hollow section 10 may also be configured in a manner that flange parts 17c of a hat-shaped panel 17 and a plate 18 are mutually joined, as illustrated in FIG. 7. In the example of FIG. 7, a top wall part 17a of the panel 17 corresponds to the top wall part 11 of the hollow section 10, a pair of heightwise wall parts 17b of the panel 17 correspond to the pair of heightwise wall parts 13a, 13b of the hollow section 10, and the plate 18 corresponds to the bottom wall part 12 of the hollow section 10. Further, in the example of FIG. 8, the pair of heightwise wall parts 17b of the panel 17 correspond to the top wall part 11 and the bottom wall part 12 of the hollow section 10, and the pair of heightwise wall parts 13a, 13b of the hollow section 10 are configured by the top wall part 17a of the panel 17 and the plate 18.

As illustrated in FIG. 2, the automobile structural member 1 has a "first reinforcing part 20" being a sheet-shaped reinforcing part, having one end portion joined to the top wall part 11 and the other end portion joined to the bottom wall part 12. In the present embodiment, two first reinforcing parts 20 are provided with an interval in the Y direction provided therebetween. In the present description, the first reinforcing part 20 on a side close to the first heightwise wall part 13a is referred to as a "first reinforcing part 20a", and the first reinforcing part 20 on a side close to the second heightwise wall part 13b is referred to as a "first reinforcing part 20b". A material of the first reinforcing part 20 is not particularly limited, and, for example, a steel material, an aluminum alloy member, a magnesium alloy member, various resin materials such as a fiber reinforced resin, and so on, can be employed. A method of joining the first reinforcing parts 20 to the top wall part 11 and the bottom wall part 12 is not particularly limited.

Note that from a viewpoint of improving the energy absorption efficiency, the top wall part 11 is preferably, out of a wall part positioned on a vehicle-exterior side and a wall part positioned on a vehicle-interior side of the automobile structural member 1, the wall part positioned on the vehicle-exterior side. Specifically, when the automobile structural member 1 is the side sill, the center pillar, or the side member of the ladder frame, for example, the top wall part 11 is preferably the wall part on the vehicle-exterior side in the vehicle width direction. When the automobile structural member 1 is the bumper beam on the front side or the cross member on the front side of the ladder frame, for example, the top wall part 11 is preferably the wall part on the front side in the vehicle length direction. When the automobile structural member 1 is the bumper beam on the rear side or the cross member on the rear side of the ladder frame, for example, the top wall part 11 is preferably the wall part on the rear side in the vehicle length direction. Specifically, when the automobile structural member 1 is the bumper beam or the cross member of the ladder frame, the top wall part 11 is preferably the wall part on the vehicle-exterior side in the vehicle length direction.

The automobile structural member 1 further has a "second reinforcing part 30" being a sheet-shaped reinforcing part and having one end portion joined to either the first heightwise wall part 13a or the second heightwise wall part 13b and the other end portion joined to the first reinforcing part 20. A plurality of the second reinforcing parts 30 are provided along a height direction of the heightwise wall part 13.

In the present embodiment, there are provided two second reinforcing parts 30 including a second reinforcing part 30a having one end portion joined to the heightwise wall part 13a and the other end portion joined to the first reinforcing part 20a, and a second reinforcing part 30b having one end portion joined to the second heightwise wall part 13b and the other end portion joined to the first reinforcing part 20b. A material of the second reinforcing part 30 is not particularly limited, and, for example, a steel material, an aluminum alloy member, a magnesium alloy member, various resin materials such as a fiber reinforced resin, and so on, can be employed.

Figure 9:
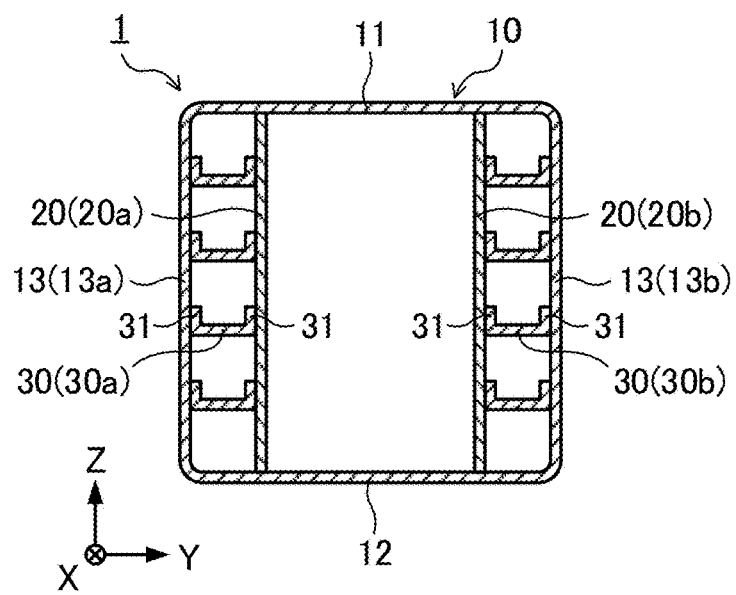
FIG. 9 is a view illustrating an example of shape of second reinforcing parts.

A method of joining the second reinforcing part 30 to the hollow section 10 and the first reinforcing part 20 is not particularly limited. For example, it is possible that, as illustrated in FIG. 9, flange portions 31 are provided to both end portions in the Y direction of the second reinforcing part 30 so that a cross-sectional shape of the second reinforcing part 30 has a U shape, and the flange portions 31, the heightwise wall part 13 and the first reinforcing part 20 are spot-welded, resulting in that the second reinforcing part 30 is joined to the hollow section 10 and the first reinforcing part 20. Further, it is also possible that the hollow section 10, the first reinforcing part 20, and the second reinforcing part 30 are joined by being integrally molded through extrusion molding, for example. A type of joining is not limited to spot welding, and it is possible to employ, for example, T-shaped fillet welding through arc welding or the like, or joining by using an adhesive or the like.

As will be described in examples to be described later, from a viewpoint of improving the energy absorption efficiency, it is preferable that the two first reinforcing parts 20, namely, the first reinforcing part 20a and the first reinforcing part 20b are not joined to each other at parts except for the top wall part 11 and the bottom wall part 12. In the example of FIG. 2, end portions in the height direction (Z direction) of the first reinforcing part 20a and the first reinforcing part 20b are joined to each other via the top wall part 11 and the bottom wall part 12, but, the first reinforcing part 20a and the first reinforcing part 20b are not joined to each other at parts except for the top wall part 11 and the bottom wall part 12, namely, in an inward space of the hollow section 10. The automobile structural member 1 as above has an improved energy absorption efficiency when compared to a case where the first reinforcing parts 20a, 20b are mutually joined at parts except for the top wall part 11 and the bottom wall part 12.

Figure 10:
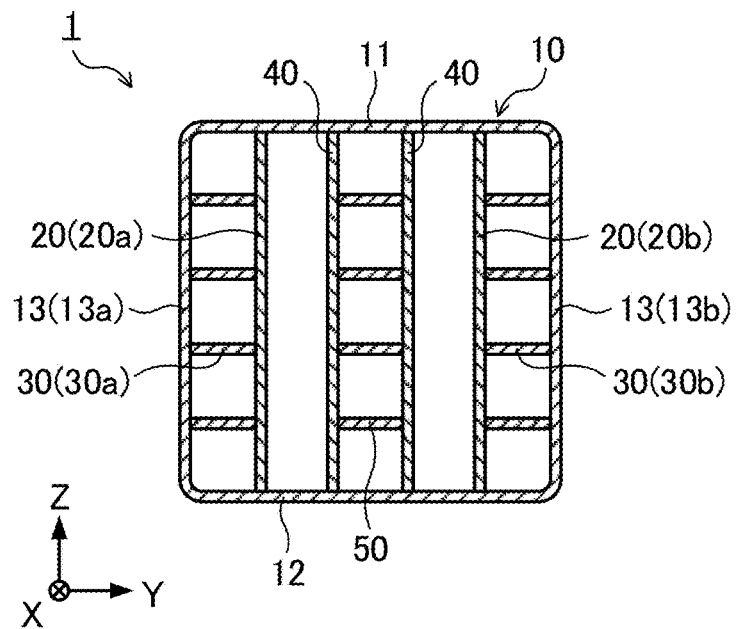
FIG. 10 is a view illustrating one example of a cross-sectional shape of an automobile structural member.

In an example of FIG. 10, two third reinforcing parts 40 and four fourth reinforcing parts 50 are provided between the first reinforcing part 20a and the first reinforcing part 20b. The third reinforcing part 40 has one end portion joined to the top wall part 11, and the other end portion joined to the bottom wall part 12, similarly to the first reinforcing part 20. The fourth reinforcing part 50 is provided between a pair of third reinforcing parts 40, and has one end portion joined to one of the third reinforcing parts 40, and the other end portion joined to the other third reinforcing part 40. Also in the automobile structural member 1 illustrated in FIG. 10, the first reinforcing part 20a and the first reinforcing part 20b are not joined to each other at parts except for the top wall part 11 and the bottom wall part 12, so that the energy absorption efficiency is likely to be improved.

Figure 11:
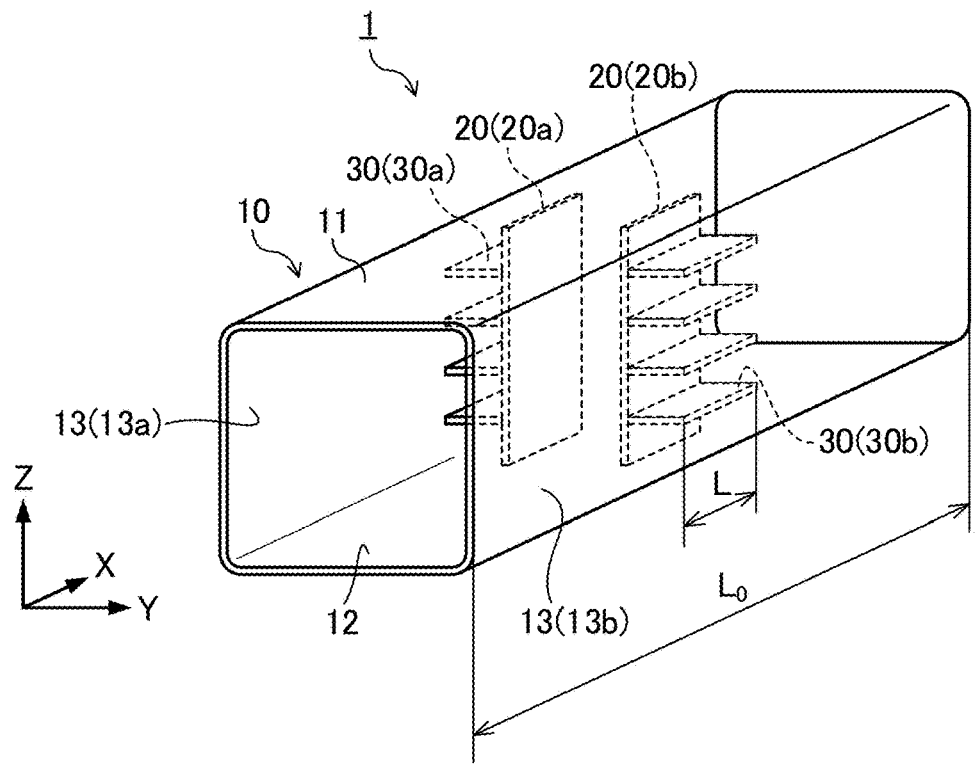
FIG. 11 is a view illustrating a structural example of an automobile structural member.

The first reinforcing parts 20 and the second reinforcing parts 30 may be provided along the entire region in the X direction of the automobile structural member 1 (the longitudinal direction of the member) as illustrated in FIG. 1, but, they may also be provided at a part of region in the X direction of the automobile structural member 1 as illustrated in FIG. 11. From a viewpoint of effectively improving the energy absorption efficiency, a length L of the first reinforcing part 20 and the second reinforcing part 30 in the X direction is preferably 2% or more of a length $L_0$ in the X direction of the automobile structural member 1. The length L of the first reinforcing part 20 and the second reinforcing part 30 is preferably 5% or more, more preferably 10% or more, and still more preferably 15% or more of the length $L_0$ of the automobile structural member 1. Further, from a viewpoint of effectively improving the energy absorption efficiency, the length L of the first reinforcing part 20 and the second reinforcing part 30 is preferably 80% or less, more preferably 60% or less, and still more preferably 40% or less of the length $L_0$ of the automobile structural member 1.

The automobile structural member 1 of the present embodiment is configured as described above. In this automobile structural member 1, there are provided the first reinforcing parts 20 joined to both the top wall part 11 and the bottom wall part 12, and the second reinforcing parts 30 each joined to both the heightwise wall part 13 and the first reinforcing part 20, in the inward of the hollow section 10, resulting in that surface rigidity of the top wall part 11 is improved. In particular, since the plural second reinforcing parts 30 are provided along the height direction of the heightwise wall parts 13, it becomes possible to effectively increase the surface rigidity of the top wall part 11. As will be described in examples to be described later, the automobile structural member 1 provided with the first reinforcing parts 20 and the second reinforcing parts 30 as in the present embodiment, is excellent in energy absorption efficiency, so that it is possible to realize both the reduction in weight and the energy absorption performance.

From a viewpoint of improving the energy absorption efficiency, it is preferable that the first reinforcing part 20 is not too close to the heightwise wall part 13. For example, as illustrated in FIG. 2, when a distance between the first heightwise wall part 13a and the second heightwise wall part 13b (a length in the Y direction) is referred to as a member width W, a distance from a central position C of the member width W to the heightwise wall part 13 on a side at which the first reinforcing part 20 exists with respect to the central position C is set to $Wh_0$, and a distance from the central position C of the member width W to the first reinforcing part 20 is set to Wh, it is preferable to satisfy $0 \le (Wh/Wh_0) \times 100 \le 95$. When the value of $(Wh/Wh_0) \times 100$ satisfies this range, the effect of improving the energy absorption efficiency becomes large.

In the present embodiment, out of the first heightwise wall part 13a and the second heightwise wall part 13b, the heightwise wall part 13 on a side at which the first reinforcing part 20a exists with respect to the central position C of the member width W, is the first heightwise wall part 13a. Accordingly, the distance $Wh_0$ from the central position C of the member width W to the first heightwise wall part 13a, and the distance Wh from the central position C of the member width W to the first reinforcing part 20a, preferably satisfy $0 \le (Wh/Wh_0) \times 100 \le 95$. Further, in the present embodiment, out of the first heightwise wall part 13a and the second heightwise wall part 13b, the heightwise wall part 13 on a side at which the first reinforcing part 20b exists with respect to the central position C of the member width W, is the second heightwise wall part 13b. Accordingly, the distance $Wh_0$ from the central position C of the member width W to the second heightwise wall part 13b, and the distance Wh from the central position C of the member width W to the first reinforcing part 20b, preferably satisfy $0 \le (Wh/Wh_0) \times 100 \le 95$.

From a viewpoint of improving the energy absorption efficiency, the value of $(Wh/Wh_0) \times 100$ is preferably 90 or less, more preferably 80 or less, and still more preferably 70 or less. Further, the value of $(Wh/Wh_0) \times 100$ is preferably 5 or more, more preferably 10 or more, and still more preferably 20 or more. Note that although the distance from the central position C of the member width W to the first reinforcing part 20a, and the distance from the central position C of the member width W to the first reinforcing part 20b may be different from each other, but, it is preferable that the first reinforcing part 20 is provided between the central position C of the member width W and the first heightwise wall part 13a, and between the central position C of the member width W and the second heightwise wall part 13b, respectively.

Figure 12:
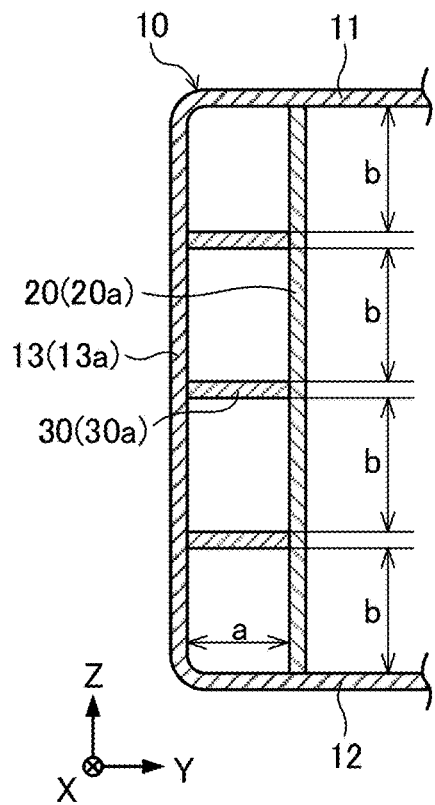
FIG. 12 is an enlarged view of a vicinity of a heightwise wall part.

From a viewpoint of improving the energy absorption efficiency, when a distance between the heightwise wall part 13 to which the second reinforcing parts 30 are joined and the first reinforcing part 20 is set to "a", and an interval between the second reinforcing parts 30 in the height direction of the heightwise wall part 13 is set to "b" as illustrated in FIG. 12, it is preferable to satisfy $0 < b/a \le 4.0$. The b/a is preferably 3.0 or less, more preferably 2.5 or less, and still more preferably 2.0 or less. Further, the b/a is preferably 0.5 or more, more preferably 0.7 or more, and still more preferably 1.0 or more.

Figure 13:
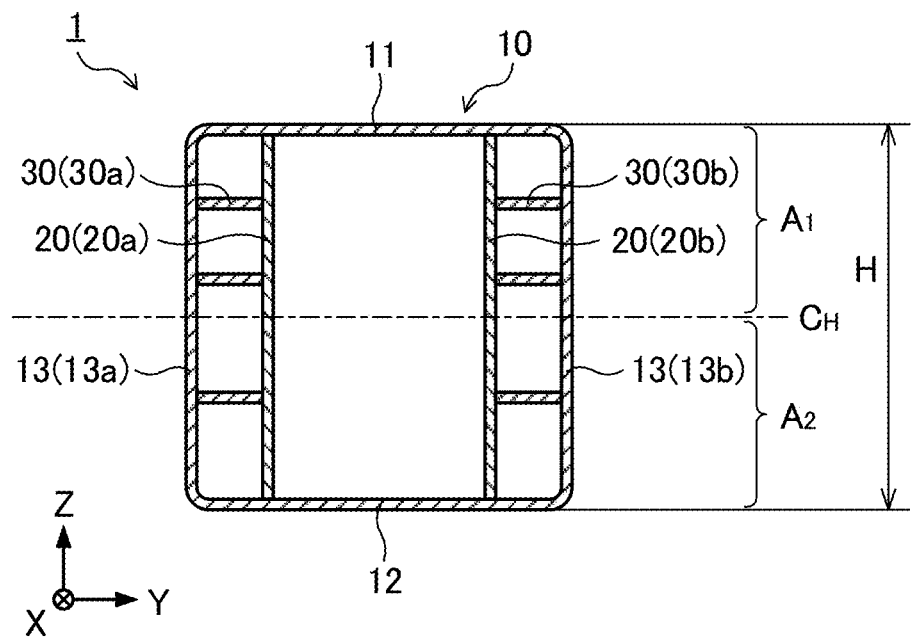
FIG. 13 is a view illustrating an example of arrangement of second reinforcing parts.

In the above-described explanation, the interval between the second reinforcing parts 30 which are adjacent to each other in the height direction is equal, but, the interval between the second reinforcing parts 30 may be different as illustrated in FIG. 13. When the interval between the second reinforcing parts 30 is different as above, it is preferable that, from a viewpoint of effectively improving the energy absorption efficiency, a large number of second reinforcing parts 30 are provided at a position closer to the top wall part 11 than the bottom wall part 12. For example, as illustrated in FIG. 13, when a distance between the top wall part 11 and the bottom wall part 12 is referred to as a member height H, a region on the top wall part 11 side from a central position $C_H$ of the member height H is referred to as a first region $A_1$, and a region on the bottom wall part 12 side from the central position $C_H$ of the member height H is referred to as a second region $A_2$, the number of the second reinforcing parts 30 provided in the first region $A_1$ in the height direction of the heightwise wall part 13 is preferably larger than the number of the second reinforcing parts 30 provided in the second region $A_2$ in the height direction of the heightwise wall part 13.

Figure 14:
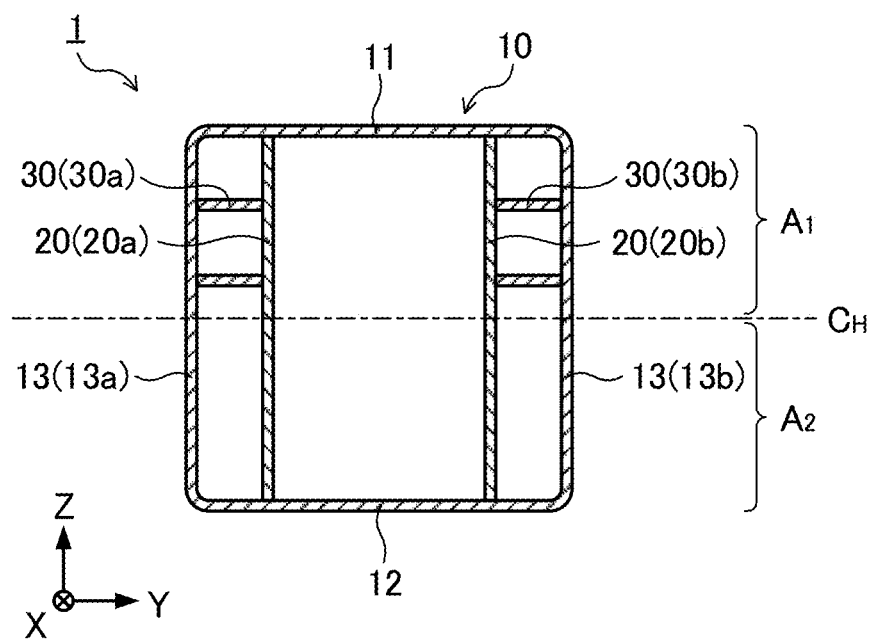
FIG. 14 is a view illustrating an example of arrangement of second reinforcing parts.
Figure 15:
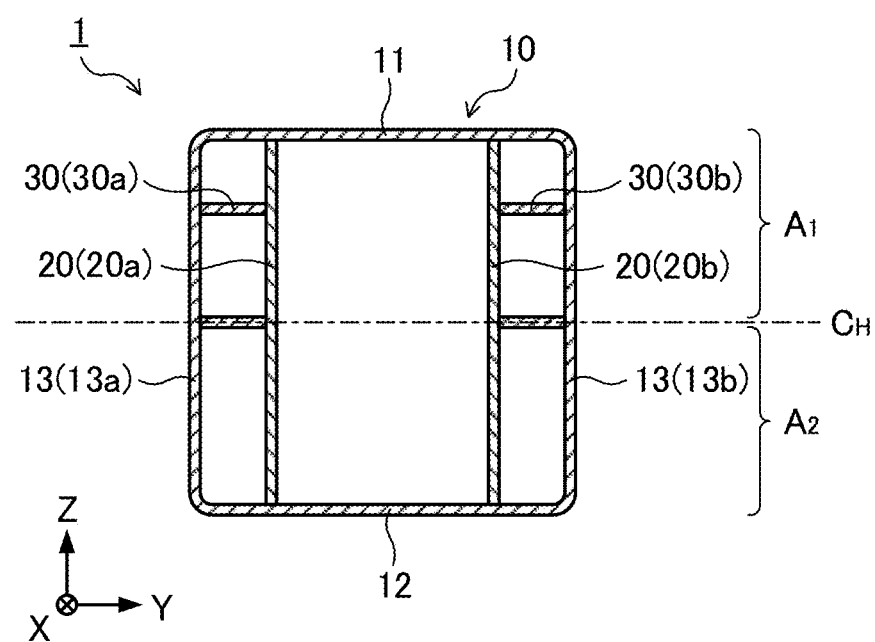
FIG. 15 is a view illustrating an example of arrangement of second reinforcing parts.

FIG. 13 illustrates an example in which, out of three second reinforcing parts 30 provided along the height direction of the heightwise wall part 13, two second reinforcing parts 30 are provided in the first region $A_1$, and the remaining one second reinforcing part 30 is provided in the second region $A_2$. FIG. 14 illustrates an example in which, out of two second reinforcing parts 30 provided along the height direction of the heightwise wall part 13, two second reinforcing parts 30 are provided in the first region $A_1$, and no second reinforcing part 30 is provided in the second region $A_2$. Note that if, when counting the number of the second reinforcing parts 30 provided in the first region $A_1$ or in the second region $A_2$, the second reinforcing part 30 is overlapped with the central position $C_H$ of the member height H as in FIG. 15, it is set that the overlapped second reinforcing part 30 is not counted as the number. Specifically, the structure in FIG. 15 is a structure in which one second reinforcing part 30 is provided in the first region $A_1$, and no second reinforcing part 30 is provided in the second region $A_2$.

Second Embodiment

Figure 16:
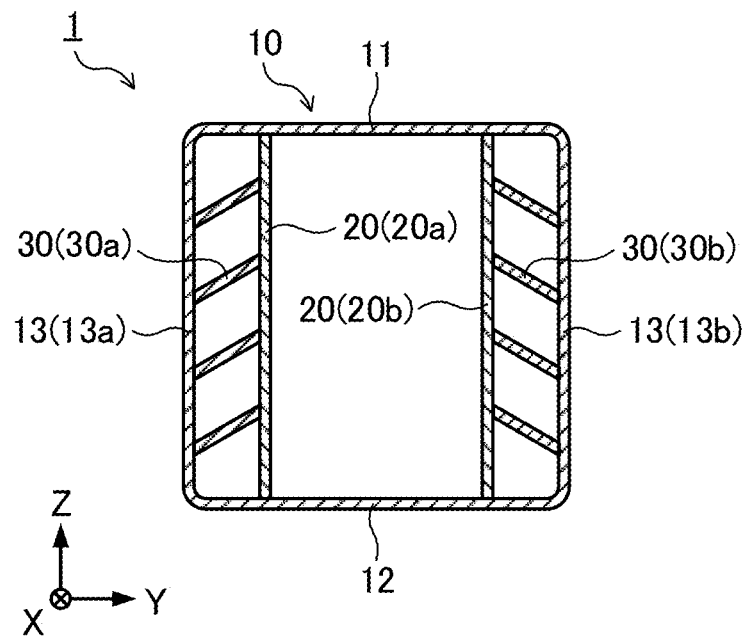
FIG. 16 is a view illustrating a cross section of an automobile structural member according to a second embodiment of the present invention, the cross section being perpendicular to an X direction (a longitudinal direction of the member).

As illustrated in FIG. 16, in an automobile structural member 1 of a second embodiment, the second reinforcing parts 30 are provided in, not a parallel manner, but an inclined manner with respect to the top wall part 11. The configuration other than the above of the automobile structural member 1 in the second embodiment is similar to that of the first embodiment.

Figure 17:
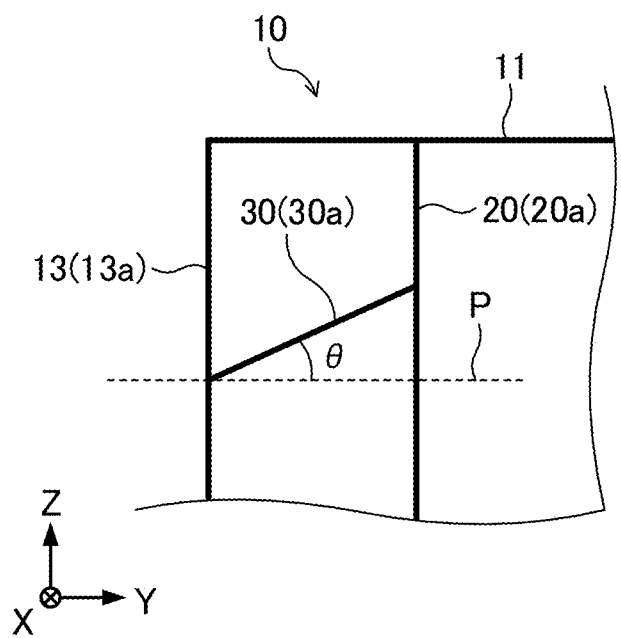
FIG. 17 is a view explaining an angle of a second reinforcing part.

The automobile structural member 1 of the second embodiment has a structure having the first reinforcing parts 20 joined to the top wall part 11 and the bottom wall part 12, and the second reinforcing parts 30 each joined to the heightwise wall part 13 and the first reinforcing part 20, and it is possible to improve the surface rigidity of the top wall part 11, similarly to the above-described first embodiment. An angle θ made by a plane P parallel to the top wall part 11 and the second reinforcing part 30 illustrated in FIG. 17 is appropriately changed according to required weight limit, energy absorption performance, and so on, but is preferably 60° or less. Further, from a viewpoint of improving the energy absorption efficiency, the closer the angle θ to 0°, the more preferable.

Third Embodiment

Figure 18:
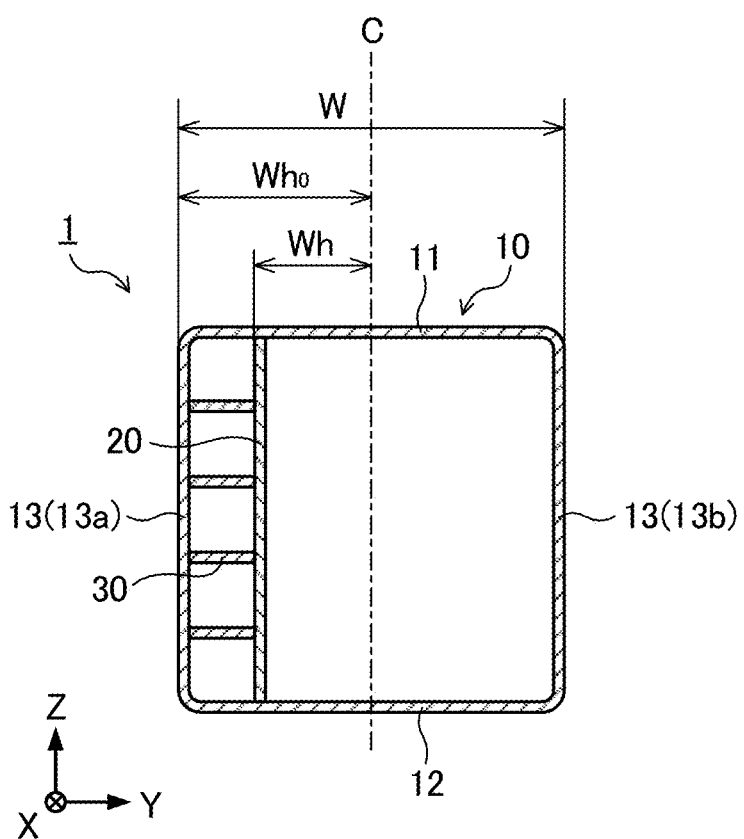
FIG. 18 is a view illustrating a cross section of an automobile structural member according to a third embodiment of the present invention, the cross section being perpendicular to an X direction (a longitudinal direction of the member).

Although the automobile structural member 1 of each of the above-described first and second embodiments is provided with two first reinforcing parts 20, an automobile structural member 1 of a third embodiment illustrated in FIG. 18 is provided with only one first reinforcing part 20. The configuration other than the above of the automobile structural member 1 in the third embodiment is similar to that of the first embodiment.

The automobile structural member 1 of the third embodiment has a structure having the first reinforcing part 20 joined to the top wall part 11 and the bottom wall part 12, and the second reinforcing parts 30 each joined to the heightwise wall part 13 and the first reinforcing part 20, and it is possible to improve the surface rigidity of the top wall part 11, similarly to the above-described first embodiment. Note that when only one first reinforcing part 20 is provided as in the third embodiment, the other end portion of the second reinforcing part 30 whose one end portion is joined to the first reinforcing part 20, is joined to either the first heightwise wall part 13a or the second heightwise wall part 13b.

Further, also in the automobile structural member 1 of the third embodiment, when the distance from the central position C of the member width W to the heightwise wall part 13 on a side at which the first reinforcing part 20 exists (the first heightwise wall part 13a in the third embodiment) is set to $Wh_0$, and the distance from the central position C of the member width W to the first reinforcing part 20 is set to Wh, $0 \leq (Wh/Wh_0) \times 100 \leq 95$ is preferably satisfied, similarly to the above-described first and second embodiments. From a viewpoint of effectively improving the energy absorption efficiency, the value of $(Wh/Wh_0) \times 100$ is preferably 90 or less, more preferably 80 or less, and still more preferably 70 or less. Further, the value of $(Wh/Wh_0) \times 100$ is preferably 5 or more, more preferably 10 or more, and still more preferably 20 or more. Note that in the automobile structural member 1 in which only one first reinforcing part 20 is provided as in the third embodiment, when the length in the Y direction of the second reinforcing part 30 is long, there can be considered a structure in which the first reinforcing part 20 in FIG. 18 is provided on the second heightwise wall part 13b side with respect to the central position C of the member width W, for example. In such a structure, the value of Wh can be a negative value, but, as long as the plural second reinforcing parts 30 are provided along the height direction of the heightwise wall part 13, it is possible to obtain the effect of improving the energy absorption efficiency.

Although one embodiment of the present invention has been described above, the present invention is not limited to such an example. It should be understood that various changes or modifications are readily apparent to those skilled in the art within the scope of the technical spirit as set forth in claims, and those should also be covered by the technical scope of the present invention as a matter of course.

EXAMPLES

Figure 19:
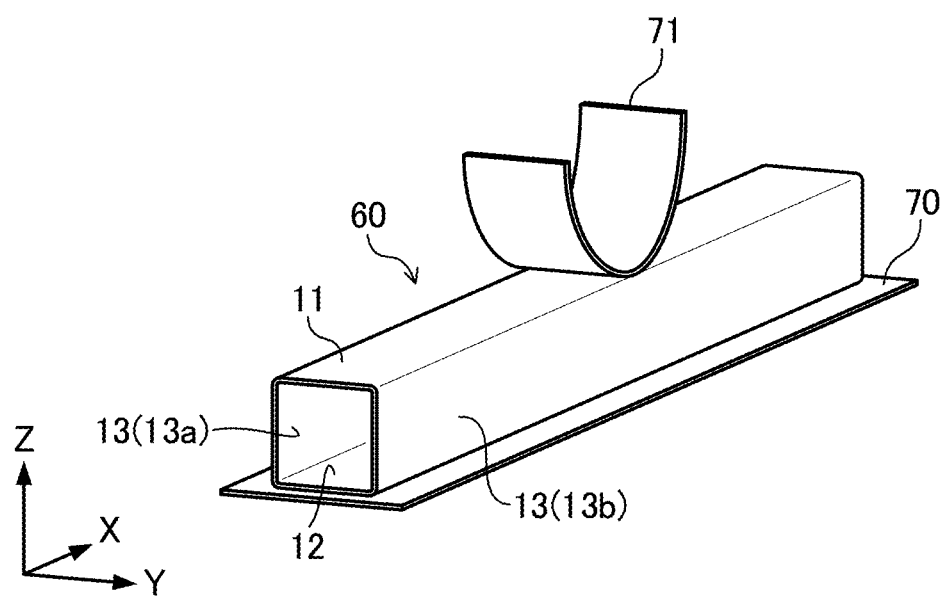
FIG. 19 is a view illustrating a condition of a bending crush simulation.

A bending crush simulation of automobile structural members was conducted. FIG. 19 is a view illustrating a simulation condition, and to a bottom wall part 12 of a hollow member 60, a rigid plate 70 is provided. The simulation is performed by pressing an impactor 71 with ϕ254 into the top wall part 11. The hollow member 60 is an angular tube-shaped aluminum extrusion member of 100 mm square, a length in the X direction of the hollow member 60 (the longitudinal direction of the member) is 1000 mm, and a sheet thickness of the member is 3.0 mm. Both end surfaces in the X direction of the hollow member 60 are restricted completely.

[Simulation 1]

Figure 20:
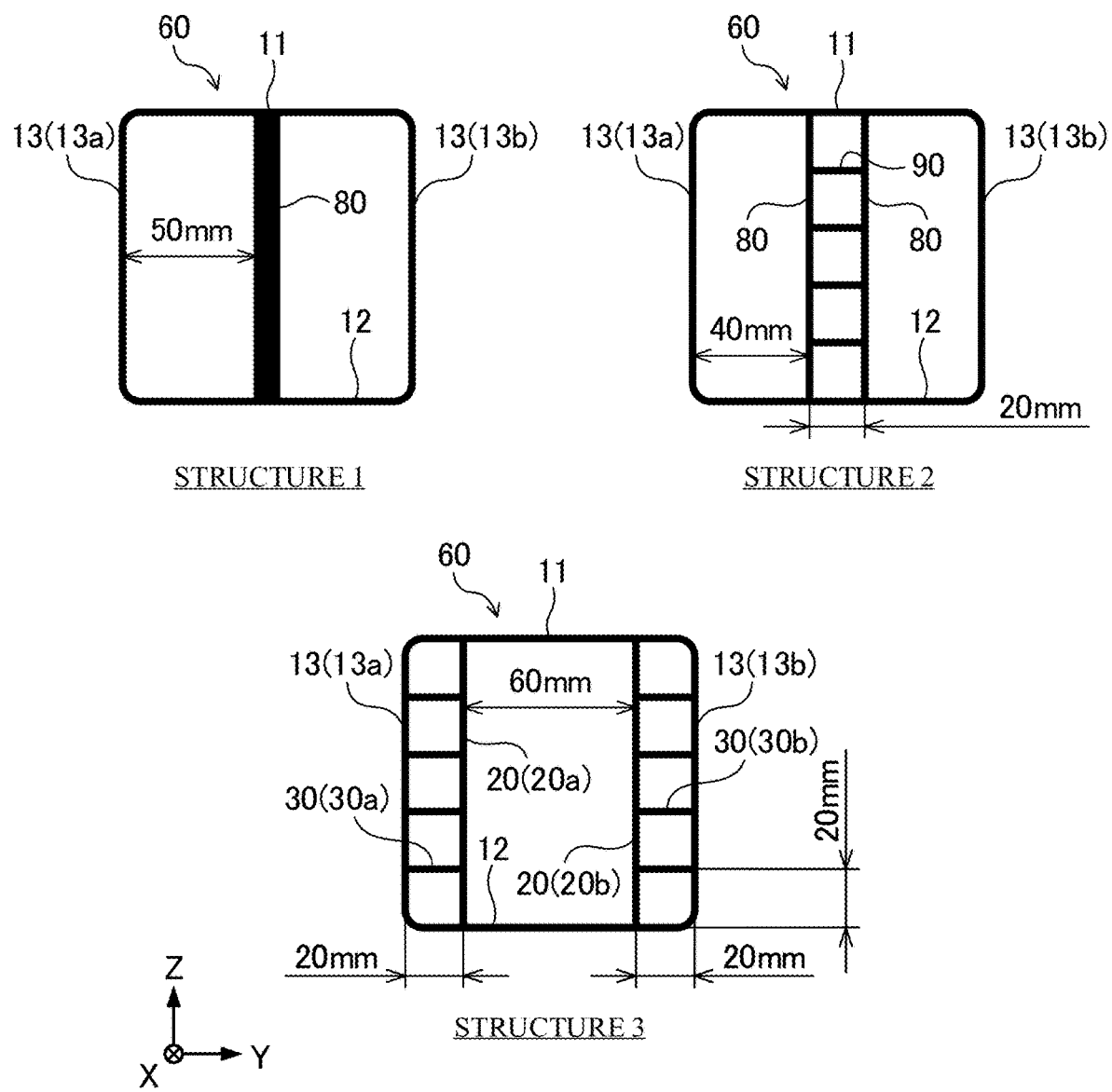
FIG. 20 is a view illustrating analysis models of automobile structural members.

Analysis models of a structure 1 to a structure 3 illustrated in FIG. 20 were produced, and a simulation was performed. The structure 1 is a model in which one reinforcing part 80 with a sheet thickness of 7.0 mm joined to the top wall part 11 and the bottom wall part 12 is provided at a central position in the Y direction of the hollow member 60. The structure 2 is a model having two reinforcing parts 80 joined to the top wall part 11 and the bottom wall part 12, and plural reinforcing parts 90 each joined to the pair of reinforcing parts 80. The structure 3 is a model in which a distance between the first reinforcing part 20a and the first reinforcing part 20b is large when compared to the structure 2, and plural second reinforcing parts 30a each joined to the first heightwise wall part 13a and the first reinforcing part 20a, and plural second reinforcing parts 30b each joined to the second heightwise wall part 13b and the first reinforcing part 20b are provided. In each of the structure 2 and the structure 3, a sheet thickness of each of the first reinforcing part and the second reinforcing part is 3.0 mm. Note that the first reinforcing part and the second reinforcing part are provided along the entire region in the X direction of the hollow member 60 (the longitudinal direction of the member).

Figure 21:
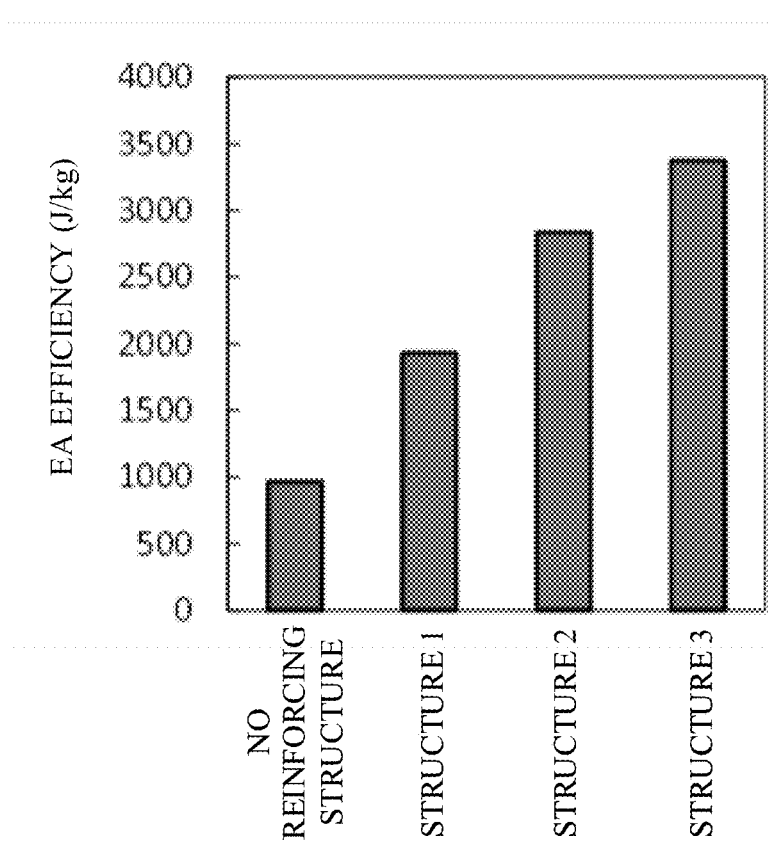
FIG. 21 is a view illustrating energy absorption efficiencies of the respective analysis models in a simulation (1).

FIG. 21 is a view illustrating energy absorption efficiencies (EA efficiencies) of the respective analysis models when a stroke of the impactor is 50 mm. In FIG. 21, an energy absorption efficiency obtained by normalizing an energy absorption amount by weight of each analysis model (energy absorption amount/weight) is calculated. As illustrated in FIG. 21, in the structure 3 in which the heightwise wall parts 13 and the first reinforcing parts 20 are joined via the plural second reinforcing parts 30, the energy absorption efficiency is increased more when compared to the structure 1 and the structure 2, and thus the first and second reinforcing parts effectively contribute to the increase in the energy absorption amount.

[Simulation (2)]

Figure 22:
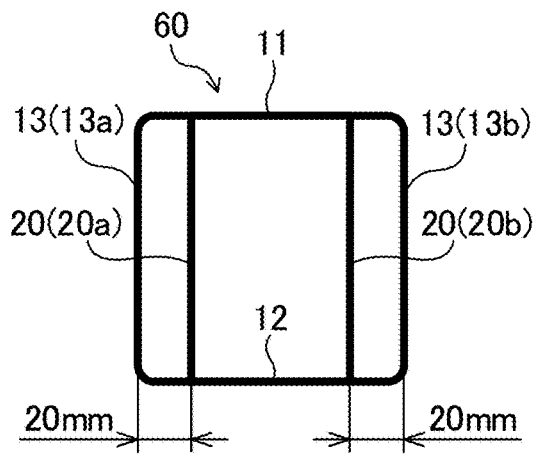
FIG. 22 is a view illustrating analysis models of automobile structural members.
Figure 22:
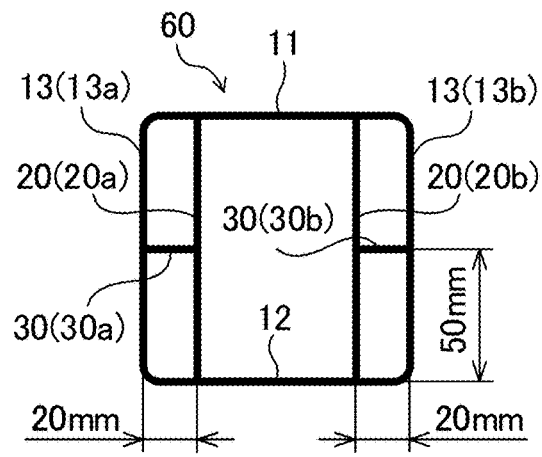
Figure 22:
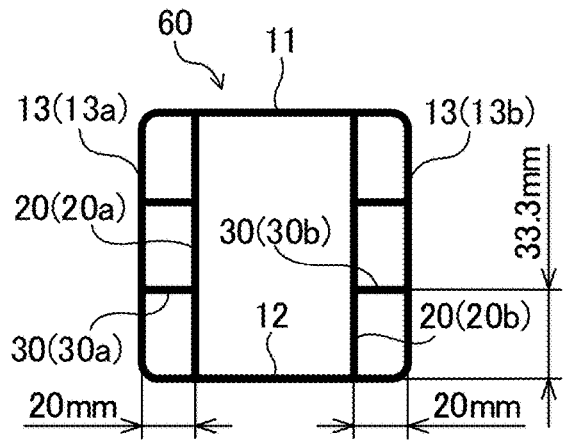
Figure 22:
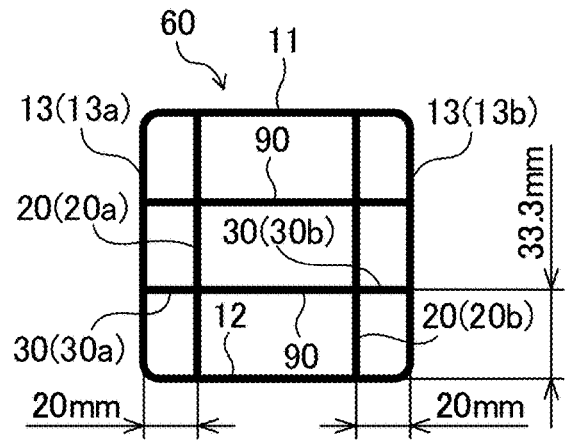
Figure 22:
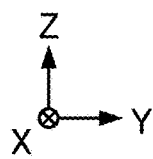

Analysis models of a structure 4 to a structure 7 illustrated in FIG. 22 were produced, and a simulation was performed. The structure 4 is a model in which only two first reinforcing parts 20 are provided. The structure 5 is a model in which second reinforcing parts 30 are further provided with respect to the structure 4. Note that in the structure 5, only one second reinforcing part 30 is provided in the height direction of the heightwise wall part 13. The structure 6 is a model in which the second reinforcing parts 30 are further provided with respect to the structure 5, the number of the second reinforcing parts 30 being two in the height direction of the heightwise wall part 13. The structure 7 is a model in which reinforcing parts 90 joined to the first reinforcing part 20a and the first reinforcing part 20b are further provided with respect to the model of the structure 6. Note that the first reinforcing parts 20 and the second reinforcing parts 30 are provided along the entire region in the X direction of the hollow member 60 (the longitudinal direction of the member).

Figure 23:
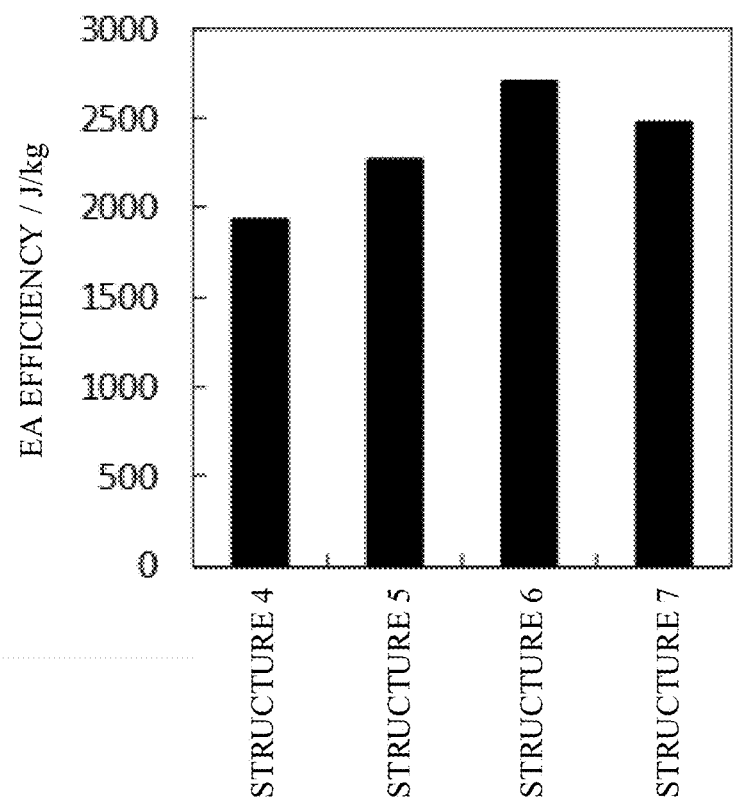
FIG. 23 is a view illustrating energy absorption efficiencies of the respective analysis models in a simulation (2).

FIG. 23 is a view illustrating energy absorption efficiencies of the respective analysis models in the present simulation. As illustrated in FIG. 23, in the structure 6 and the structure 7 in each of which the plural second reinforcing parts 30 are provided along the height direction of the heightwise wall parts 13, the energy absorption efficiency is improved more when compared to the structure 4 in which no second reinforcing part 30 is provided, and the structure 5 in which only one second reinforcing part 30 is provided in the height direction of the heightwise wall part 13. Further, the energy absorption efficiency of the structure 6 is further improved when compared to the energy absorption efficiency of the structure 7 in which the reinforcing parts 90 connecting the two first reinforcing parts 20 are provided. In view of this result, it is preferable that the two first reinforcing parts 20 are not mutually joined at parts except for the top wall part 11 and the bottom wall part 12.

[Simulation (3)]

Figure 24:
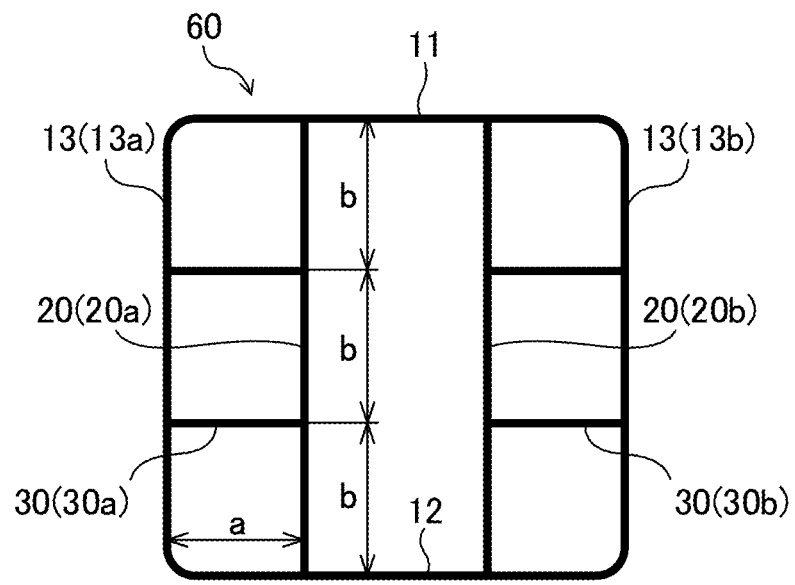
FIG. 24 is a view illustrating analysis models of automobile structural members.
Figure 24:
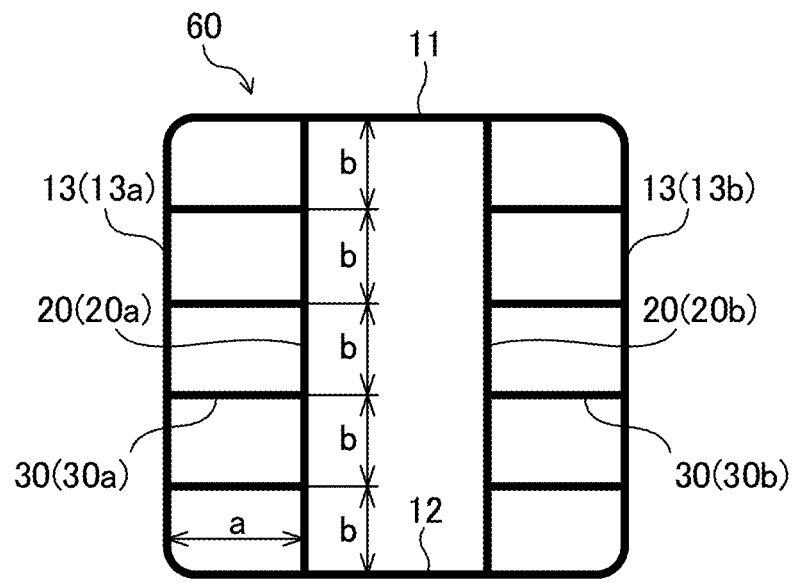

A simulation was performed by using analysis models in each of which a ratio between an interval b between the second reinforcing parts 30 in the height direction of the heightwise wall part 13 and a distance between the heightwise wall part 13 and the first reinforcing part 20 (b/a) was different. Each of a structure 8 and a structure 9 illustrated in FIG. 24 is one of analysis models in the present simulation. In the present simulation, there are produced plural models in which only a value of a in the structure 8 (a=30 mm, b=33.3 mm) is changed and plural models in which only a value of a in the structure 9 (a=30 mm, b=20 mm) is changed. Note that the first reinforcing parts 20 and the second reinforcing parts 30 are provided along the entire region in the X direction of the hollow member 60 (the longitudinal direction of the member).

Figure 25:
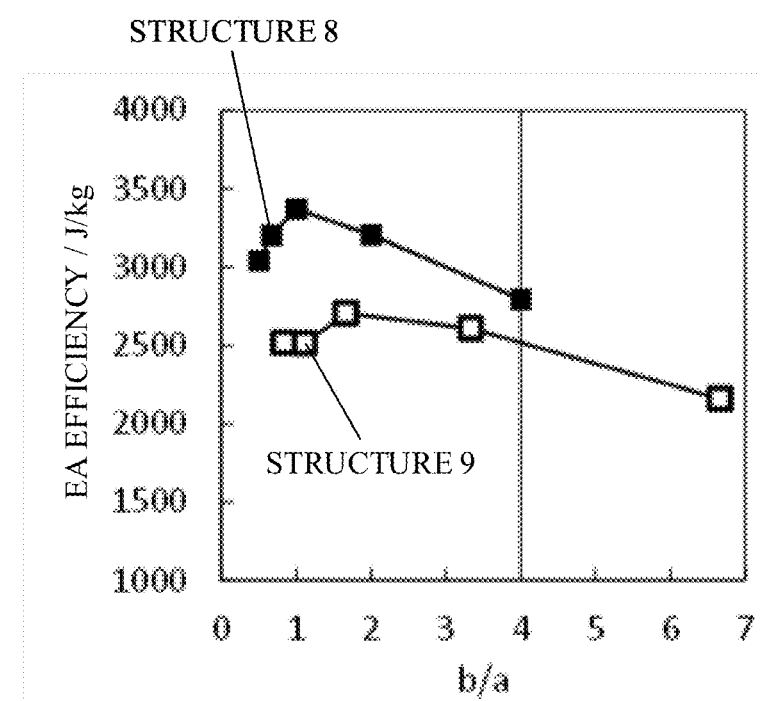
FIG. 25 is a view illustrating energy absorption efficiencies of the respective analysis models in a simulation (3).

FIG. 25 is a view illustrating energy absorption efficiencies of the respective analysis models in the present simulation. As indicated by the result in FIG. 25, it can be understood that as long as a value of b/a is 4.0 or less, there is provided a large effect of improving the energy absorption efficiency.

[Simulation (4)]

Figure 26:
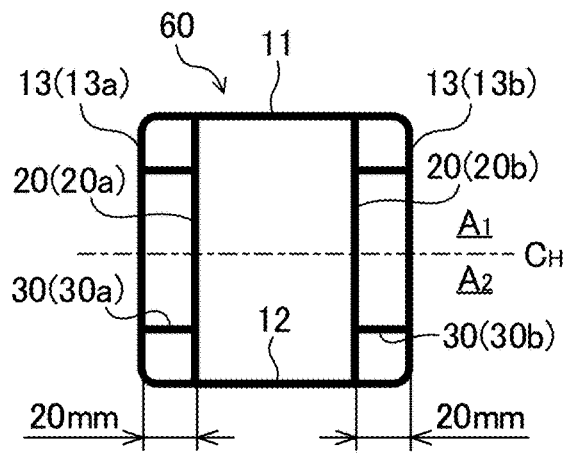
FIG. 26 is a view illustrating analysis models of automobile structural members.
Figure 26:
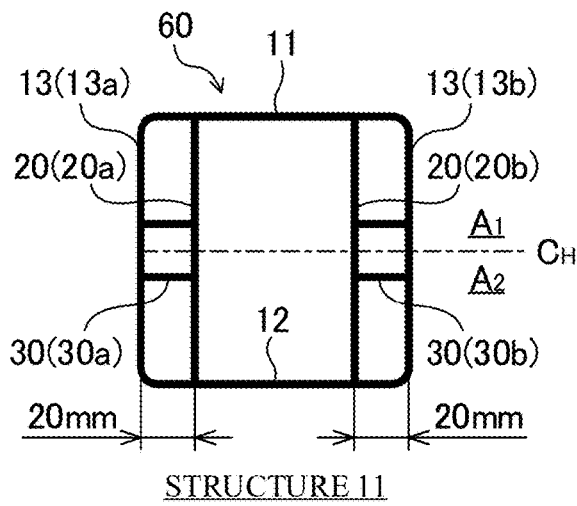
Figure 26:
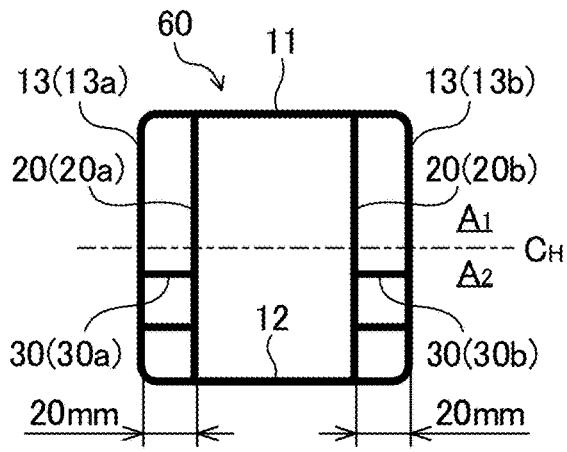
Figure 26:
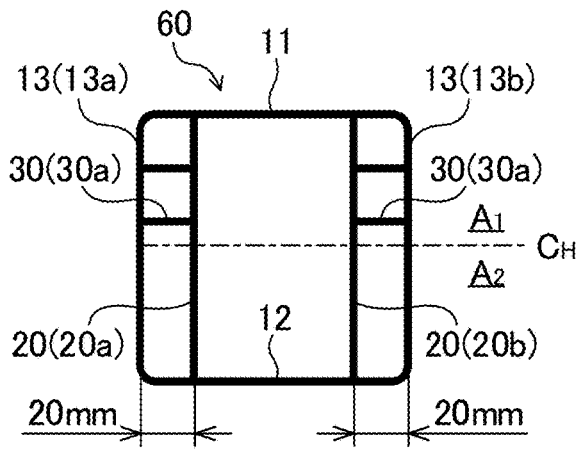
Figure 26:
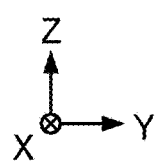

Analysis models of a structure 10 to a structure 13 illustrated in FIG. 26 were produced, and a simulation was performed. The structure 10 is a model in which the interval between the second reinforcing parts 30 is increased with respect to the structure 6 in FIG. 22. The structure 11 is a model in which the interval between the second reinforcing parts 30 is reduced with respect to the structure 6 in FIG. 22. The structure 12 is a model in which no second reinforcing part 30 is provided in the first region $A_1$, and two second reinforcing parts 30 are provided in the second region $A_2$. The structure 13 is a model in which two second reinforcing parts 30 are provided in the first region $A_1$, and no second reinforcing part 30 is provided in the second region $A_2$. Note that the first reinforcing parts 20 and the second reinforcing parts 30 are provided along the entire region in the X direction of the hollow member 60 (the longitudinal direction of the member).

Figure 27:
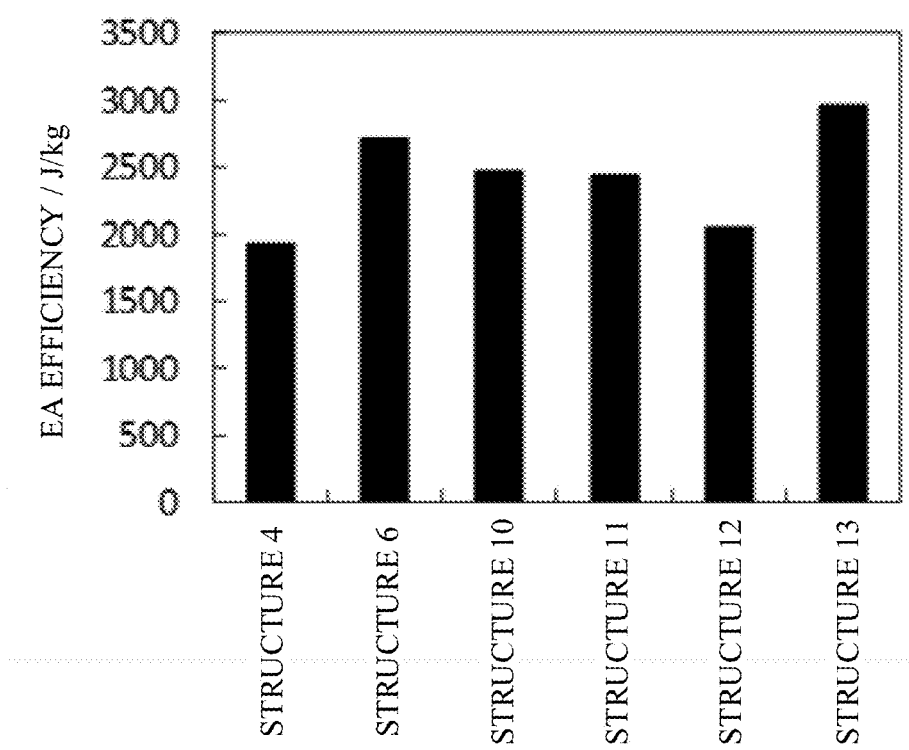
FIG. 27 is a view illustrating energy absorption efficiencies of the respective analysis models in a simulation (4).

FIG. 27 is a view illustrating energy absorption efficiencies of the respective analysis models in the present simulation. As indicated by the result in FIG. 27, even when the interval between the second reinforcing parts 30 in the height direction is different, it is possible to obtain a high energy absorption efficiency. In particular, the structure 13 in which the number of second reinforcing parts 30 provided in the first region $A_1$ is larger than the number of second reinforcing parts 30 provided in the second region $A_2$, was further excellent in the energy absorption efficiency when compared to the other structures.

[Simulation (5)]

Figure 28:
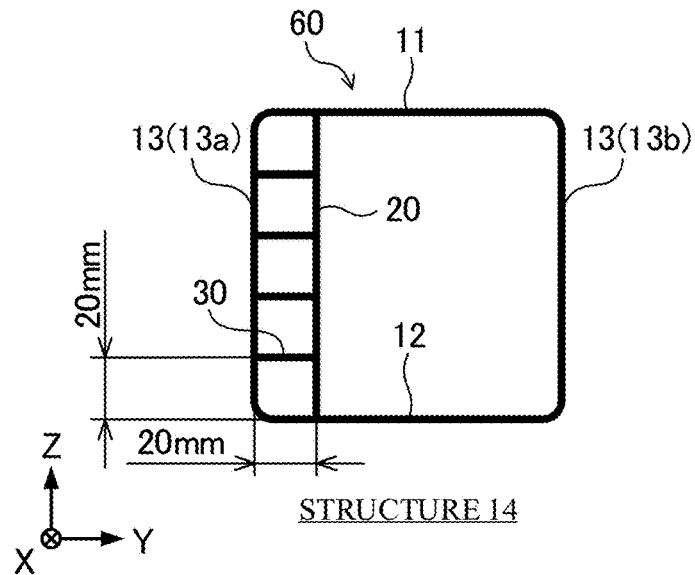
FIG. 28 is a view illustrating an analysis model of an automobile structural member.

An analysis model of a structure 14 illustrated in FIG. 28 was produced, and a simulation was performed. The structure 14 is a model having the first reinforcing part 20 provided on only one side relative to a central position in the Y direction of the hollow member 60 set as a boundary, and plural second reinforcing parts 30. Note that the first reinforcing part 20 and the second reinforcing parts 30 are provided along the entire region in the X direction of the hollow member 60 (the longitudinal direction of the member).

Figure 29:
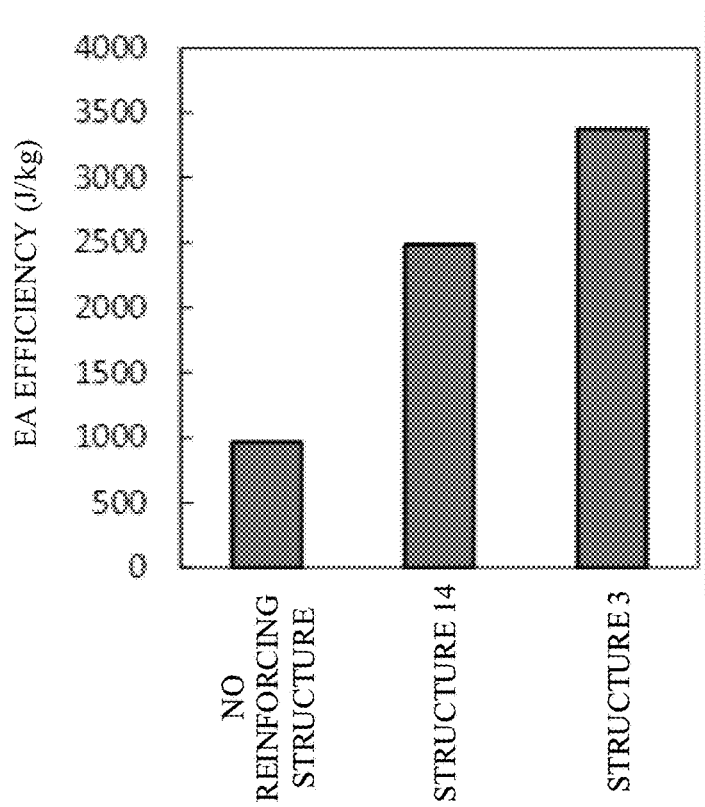
FIG. 29 is a view illustrating energy absorption efficiencies of the respective analysis models in a simulation (5).

FIG. 29 is a view illustrating energy absorption efficiencies of the respective analysis models in the present simulation. As illustrated in FIG. 29, even in a case where only one first reinforcing part is provided, as long as the plural second reinforcing parts are joined to the heightwise wall part and the first reinforcing part, it is possible to obtain the effect of improving the energy absorption efficiency.

[Simulation (6)]

Figure 30:
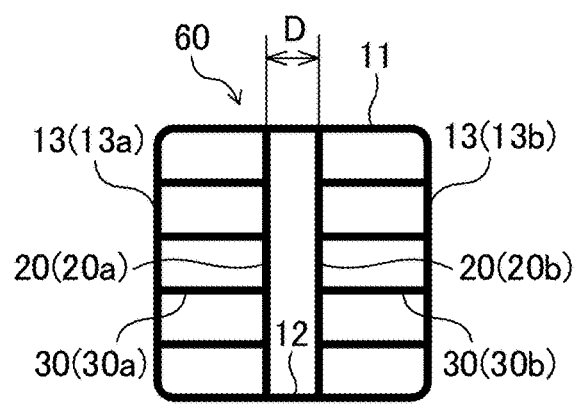
FIG. 30 is a view illustrating analysis models of automobile structural members.
Figure 30:
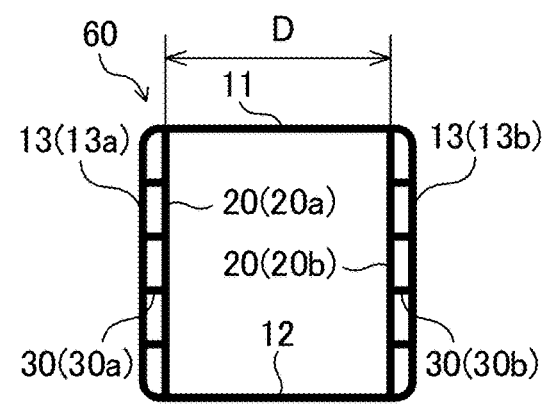
Figure 30:
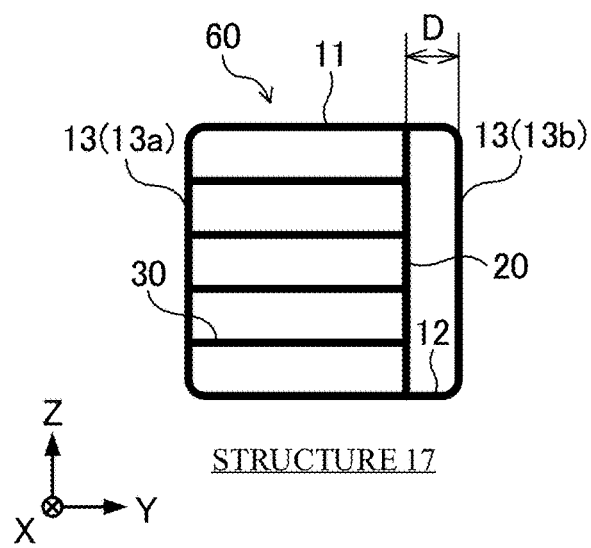
Figure 30:
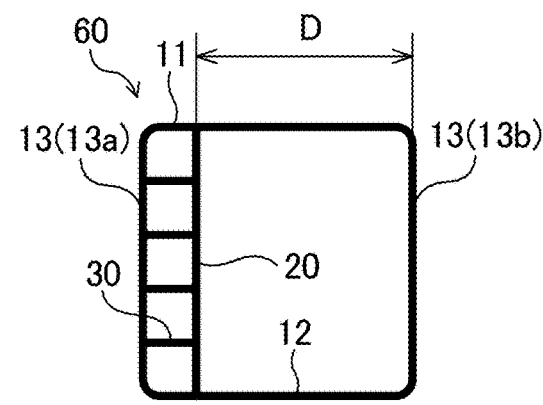

Plural analysis models in each of which a distance D between the first reinforcing part 20a and the first reinforcing part 20b was changed, such as a structure 15 and a structure 16 illustrated in FIG. 30, were produced, and a simulation was performed. Further, plural analysis models in each of which only one first reinforcing part 20 was provided, and a distance D between the first reinforcing part 20 and the second heightwise wall part 13b was changed, such as a structure 17 and a structure 18 illustrated in FIG. 30, were produced, and the simulation was performed. Note that the first reinforcing part 20 and the second reinforcing parts 30 are provided along the entire region in the X direction of the hollow member 60 (the longitudinal direction of the member).

Figure 31:
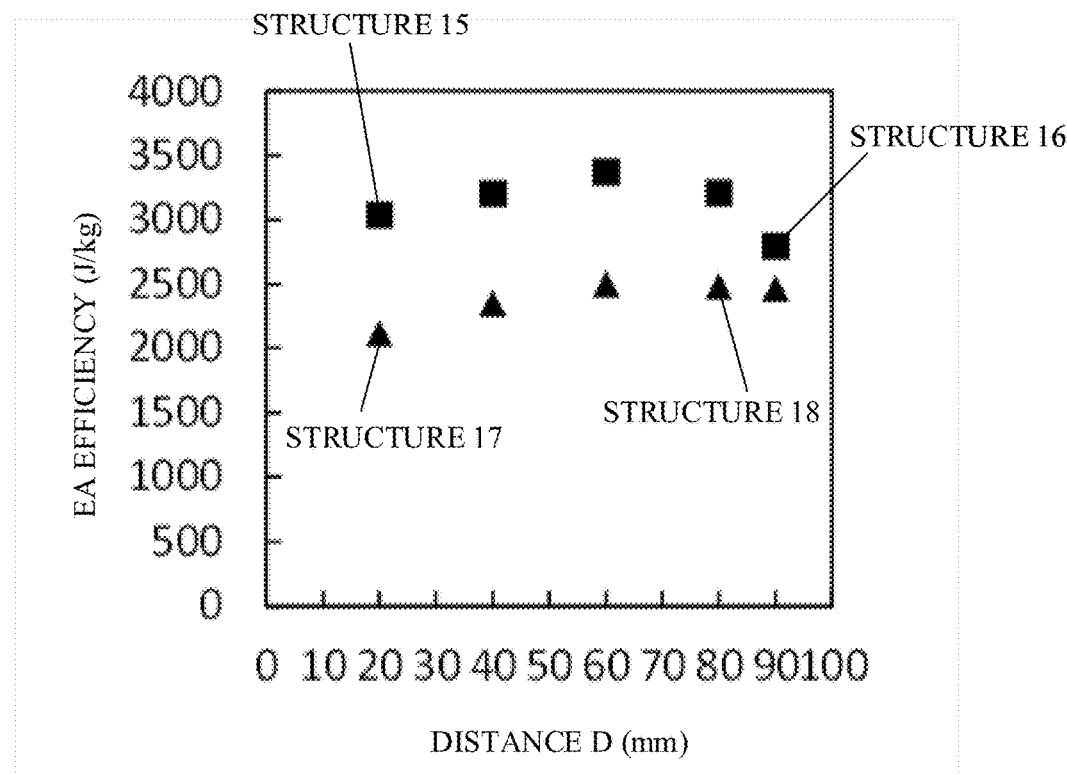
FIG. 31 is a view illustrating energy absorption efficiencies of the respective analysis models in a simulation (6).

FIG. 31 is a view illustrating energy absorption efficiencies of the respective analysis models in the present simulation. As illustrated in FIG. 31, in the structure 16 being the structure provided with two first reinforcing parts and having a large distance D, a high energy absorption efficiency is obtained. Further, in the case where the distance D is smaller than that of the structure 16, the energy absorption efficiency is further improved. The value of $(Wh/Wh_0) \times 100$ in the structure 16 is 90, and in the result of the present simulation, the highest energy absorption efficiency was obtained when the distance D was 60, namely, when the value of $(Wh/Wh_0) \times 100$ was 60.

As illustrated in FIG. 31, in each of the structure 17 being the structure provided with one first reinforcing part and having a small distance D, and the structure 18 being the structure provided with one first reinforcing part and having a large distance D, a high energy absorption efficiency is obtained. Further, the closer the distance D is to the central position in the Y direction of the hollow member 60, the more the energy absorption efficiency is improved.

[Simulation (7)]

Plural analysis models in each of which the length L of the first reinforcing part 20 and the second reinforcing part 30 in the longitudinal direction of the automobile structural member was changed, were produced, and a simulation was performed. A cross-sectional shape of the first reinforcing parts 20 and the second reinforcing parts 30 is the same as that of the structure 3 in FIG. 20.

Figure 32:
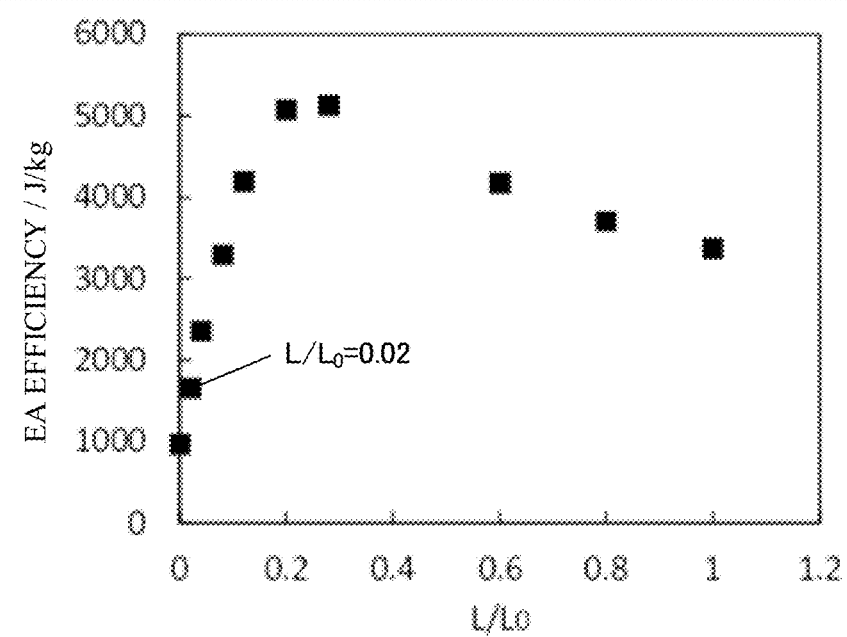
FIG. 32 is a view illustrating energy absorption efficiencies of the respective analysis models in a simulation (7).

FIG. 32 is a view illustrating energy absorption efficiencies of the respective analysis models in the present simulation. Note that "$L_0$" in FIG. 32 is the length in the longitudinal direction of the hollow member 60 (FIG. 19). According to the result in FIG. 32, the length L of the first reinforcing part 20 and the second reinforcing part 30 is preferably a length of 2% or more of the length $L_0$ of the hollow member.

[Simulation (8)]

Figure 33:
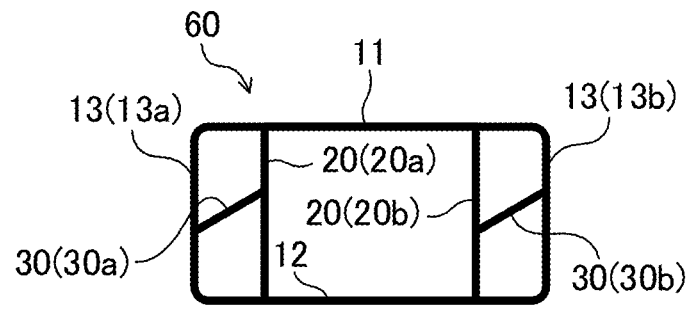
FIG. 33 is a view illustrating analysis models of automobile structural members.
Figure 33:
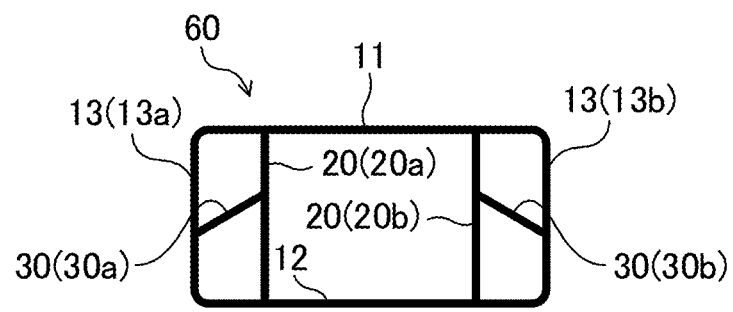
Figure 33:
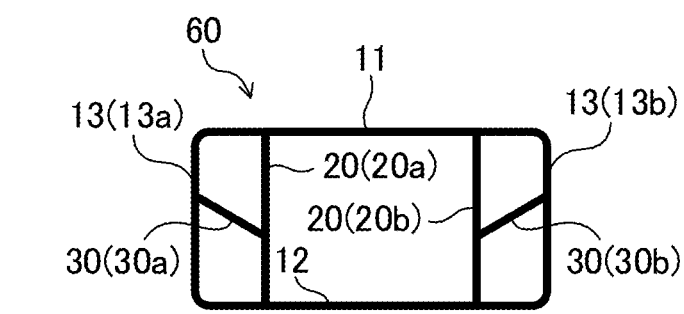
Figure 33:
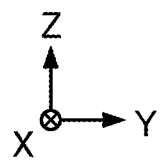

Plural analysis models in each of which the second reinforcing parts 30 were inclined with respect to the top wall part 11 of the hollow member 60 were produced, and a simulation was performed. The analysis models are models of changing an angle θ made by the plane P parallel to the top wall part 11 and the second reinforcing part 30 (FIG. 17) in each of the cases of inclination patterns A to C of the second reinforcing parts 30 illustrated in FIG. 33. The simulation is performed with respect to the cases where the angle θ is 0°, 30°, 45°, and 60°. Note that the first reinforcing parts 20 and the second reinforcing parts 30 are provided along the entire region in the X direction of the hollow member 60 (the longitudinal direction of the member).

Figure 34:
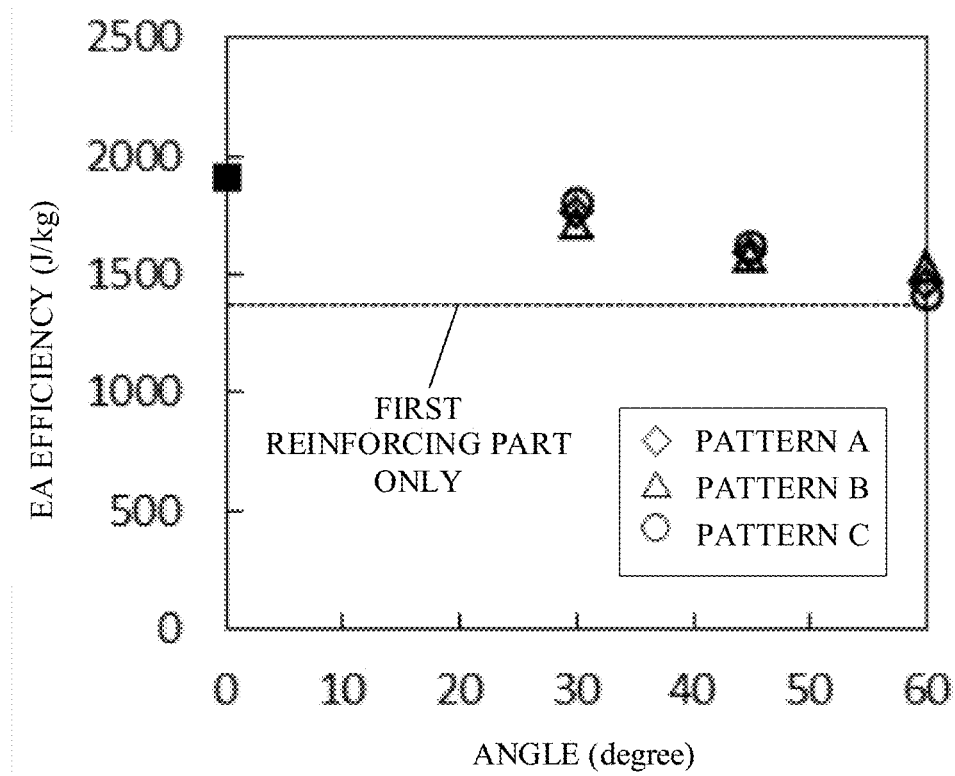
FIG. 34 is a view illustrating energy absorption efficiencies of the respective analysis models in a simulation (8).

FIG. 34 illustrates energy absorption efficiencies of the respective analysis models when a stroke of the impactor is 25 mm. As illustrated in FIG. 34, when comparing the results when the angle θ is the same angle, there is no large difference in the energy absorption efficiency among the patterns A to C. Therefore, when the second reinforcing parts are inclined, the way of inclination is not particularly limited. Further, even in the case where the angle θ is 60°, the energy absorption efficiency is improved when comparing the case with the analysis model provided with only the first reinforcing parts, and the closer the angle θ is to 0°, the more the energy absorption efficiency is improved. Therefore, the angle θ between the plane parallel to the top wall part and the second reinforcing part is preferably 60° or less.

INDUSTRIAL APPLICABILITY

The present invention can be utilized as, for example, a side sill, a bumper beam, a center pillar, a side member of a ladder frame, or a cross member of a ladder frame.

EXPLANATION OF CODES 1 automobile structural member
10 hollow section
11 top wall part
12 bottom wall part
13 heightwise wall part
13a first heightwise wall part
13b second heightwise wall part
15 outer panel
15a top wall part of outer panel
15b heightwise wall part of outer panel
15c flange part of outer panel
16 inner panel
16a top wall part of inner panel
16b heightwise wall part of inner panel
16c flange part of inner panel
17 panel
18 plate
20 first reinforcing part
20a first reinforcing part
20b first reinforcing part
30 second reinforcing part
30a second reinforcing part
30b second reinforcing part
31 flange portion of second reinforcing part
40 third reinforcing part
50 fourth reinforcing part
60 hollow member
70 rigid plate
71 impactor
80 reinforcing part
90 reinforcing part
C central position of member width
$C_H$ central position of member height
H member height
L length of first reinforcing part and second reinforcing part in longitudinal direction of automobile structural member
$L_0$ length in longitudinal direction of automobile structural member
W member width

The invention claimed is:

1. An automobile structural member comprising a hollow automobile structural member having: a top wall part; a bottom wall part facing the top wall part; and a first heightwise wall part and a second heightwise wall part comprising a pair of heightwise wall parts that connect to the top wall part and the bottom wall part, the automobile structural member comprising:
   a first reinforcing part having one end portion joined to the top wall part and the other end portion joined to the bottom wall part; and
   a second reinforcing part having one end portion joined to the first heightwise wall part, and the other end portion joined to the first reinforcing part, wherein
   three or four of the second reinforcing parts are provided along a height direction of the first heightwise wall part,
   wherein the automobile structural member in which the one end portion of the second reinforcing part is joined to the first heightwise wall part and the other end portion of the second reinforcing part is joined to the first reinforcing part, further comprising:
   another first reinforcing part having one end portion joined to the top wall part and the other end portion joined to the bottom wall part, and provided between the first reinforcing part and the second heightwise wall part; and
   another second reinforcing part having one end portion joined to the second heightwise wall part and the other end portion joined to the other first reinforcing part, wherein
   three or four of the other second reinforcing parts are provided along the height direction of the second heightwise wall part, and
   wherein the first reinforcing parts, whose number is two, which are mutually joined via the top wall part and the bottom wall part, are not mutually joined at parts except for the top wall part and the bottom wall part.

2. The automobile structural member according to claim 1, wherein when a distance between the top wall part and the bottom wall part is referred to as a member height, a region from a central position of the member height to the top wall part side is referred to as a first region, and a region from the central position of the member height to the bottom wall part side is referred to as a second region, a number of the second reinforcing parts provided in the first region is larger than a number of the second reinforcing parts provided in the second region.

3. The automobile structural member according to claim 2, wherein
when an interval between the second reinforcing parts in the height direction of the heightwise wall part is set to b, and a distance between the heightwise wall part to which the second reinforcing parts are joined and the first reinforcing part is set to a, $0<b/a\leq4.0$ is satisfied.

4. The automobile structural member according to claim 1, wherein
when an interval between the second reinforcing parts in the height direction of the heightwise wall part is set to b, and a distance between the heightwise wall part to which the second reinforcing parts are joined and the first reinforcing part is set to a, $0<b/a\leq4.0$ is satisfied.

5. The automobile structural member according to claim 1, wherein
when a distance between the first heightwise wall part and the second heightwise wall part is referred to as a member width, a distance from a central position of the member width to the heightwise wall part to which the one end portion of the second reinforcing part is joined is set to $Wh_0$, and a distance from the central position of the member width to the first reinforcing part to which the other end portion of the second reinforcing part is joined is set to Wh, $5\leq(Wh/Wh_0)\times100\leq95$ is satisfied.

6. The automobile structural member according to claim 1, wherein
the top wall part, the bottom wall part, the first heightwise wall part, the second heightwise wall part, the first reinforcing part, and the second reinforcing part are integrally molded.

7. The automobile structural member according to claim 1, wherein
a length of the first reinforcing part and the second reinforcing part in a longitudinal direction of the automobile structural member is 2% or more of a length in the longitudinal direction of the automobile structural member.

8. The automobile structural member according to claim 1, wherein
an angle made by a plane parallel to the top wall part and the second reinforcing part is 60° or less.

9. The automobile structural member according to claim 1, wherein
the automobile structural member is a side sill, a center pillar, or a side member of a ladder frame.

10. The automobile structural member according to claim 9, wherein
the top wall part is a wall part on a vehicle-exterior side in a vehicle width direction.

11. The automobile structural member according to claim 1, wherein
the automobile structural member is a bumper beam or a cross member of a ladder frame.

12. The automobile structural member according to claim 11, wherein
the top wall part is a wall part on a vehicle-exterior side in a vehicle length direction.

13. An automobile structural member comprising a hollow automobile structural member having: a top wall part; a bottom wall part facing the top wall part; and a first heightwise wall part and a second heightwise wall part comprising a pair of heightwise wall parts that connect to the top wall part and the bottom wall part, the automobile structural member comprising:
a first reinforcing part having one end portion joined to the top wall part and the other end portion joined to the bottom wall part;
a second reinforcing part having one end portion joined to the first heightwise wall part, and the other end portion joined to the first reinforcing part;
another first reinforcing part having one end portion joined to the top wall part and the other end portion joined to the bottom wall part, and provided between the first reinforcing part and the second heightwise wall part; and
another second reinforcing part having one end portion joined to the second heightwise wall part and the other end portion joined to the other first reinforcing part,
wherein three or four of the second reinforcing parts are provided along a height direction of the first heightwise wall part,
wherein the first reinforcing parts, whose number is two, which are mutually joined via the top wall part and the bottom wall part, are not mutually joined at parts except for the top wall part and the bottom wall part, and
wherein when a distance between the first heightwise wall part and the second heightwise wall part is referred to as a member width, a distance from a central position of the member width to the heightwise wall part to which the one end portion of the second reinforcing part is joined is set to Wh0, and a distance from the central position of the member width to the first reinforcing part to which the other end portion of the second reinforcing part is joined is set to Wh, $5\leq(Wh/Wh_0)\times100\leq95$ is satisfied.

14. The automobile structural member according to claim 13, wherein
when an interval between the second reinforcing parts in the height direction of the heightwise wall part is set to b, and a distance between the heightwise wall part to which the second reinforcing parts are joined and the first reinforcing part is set to a, $0<b/a\leq4.0$ is satisfied.

15. The automobile structural member according to claim 13, wherein
when a distance between the top wall part and the bottom wall part is referred to as a member height, a region from a central position of the member height to the top wall part side is referred to as a first region, and a region from the central position of the member height to the bottom wall part side is referred to as a second region, a number of the second reinforcing parts provided in the first region is larger than a number of the second reinforcing parts provided in the second region.

16. The automobile structural member according to claim 15, wherein
when an interval between the second reinforcing parts in the height direction of the heightwise wall part is set to b, and a distance between the heightwise wall part to which the second reinforcing parts are joined and the first reinforcing part is set to a, $0<b/a\leq4.0$ is satisfied.

* * * * *